United States Patent [19]
Hirano et al.

[11] Patent Number: 5,724,617
[45] Date of Patent: Mar. 3, 1998

[54] PHOTOGRAPHING APPARATUS HAVING VIBRATION REDUCING MECHANISM

[75] Inventors: Shinichi Hirano, Utsunomiya; Tatsuo Amanuma, Ageo; Fumiya Taguchi, Kawasaki; Tadao Kai, Kawasaki; Yoshio Imura, Kawasaki, all of Japan

[73] Assignee: Nikon Corporation, Tokyo, Japan

[21] Appl. No.: 708,507

[22] Filed: Sep. 5, 1996

[30] Foreign Application Priority Data

Sep. 7, 1995 [JP] Japan ................................. 7-229862
Sep. 8, 1995 [JP] Japan ................................. 7-231375
Sep. 14, 1995 [JP] Japan ................................. 7-236974

[51] Int. Cl.⁶ ........................................ G03B 17/00
[52] U.S. Cl. ........................ 396/55; 396/158; 396/303
[58] Field of Search ............................ 396/52, 55, 158, 396/303

[56] References Cited

U.S. PATENT DOCUMENTS

| | | | |
|---|---|---|---|
| 4,965,619 | 10/1990 | Shikaumi et al. | 396/55 |
| 5,101,230 | 3/1992 | Shikaumi et al. | 396/54 |
| 5,175,580 | 12/1992 | Shiomi | 396/55 |
| 5,210,563 | 5/1993 | Hamada et al. | 396/53 |
| 5,589,912 | 12/1996 | Shiomi | 396/55 |
| 5,598,246 | 1/1997 | Miyamoto et al. | 396/55 |

*Primary Examiner*—Russell E. Adams

[57] ABSTRACT

A photographing apparatus having a vibration reducing mechanism comprises a photographing optical system, a preparatory flash device for preventing a pink-eye, and a vibration reducing mechanism for detecting a vibration quantity of an optical axis of the photographing optical system and moving a whole or a part of the photographing optical system relatively to a photographing picture. The photographing apparatus has a function of stopping the preparatory flash device when the vibration reducing mechanism is in an operable state.

53 Claims, 22 Drawing Sheets

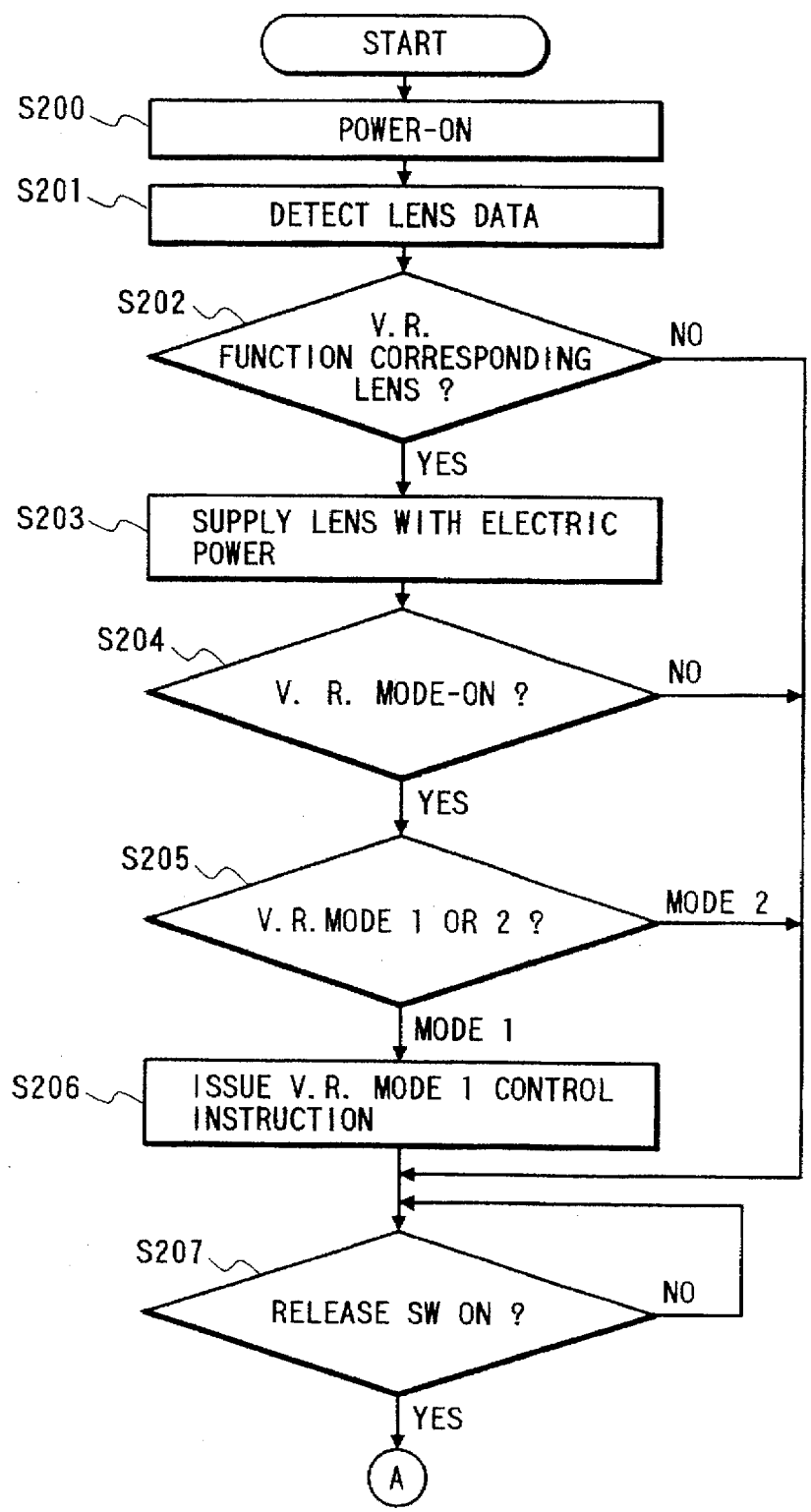

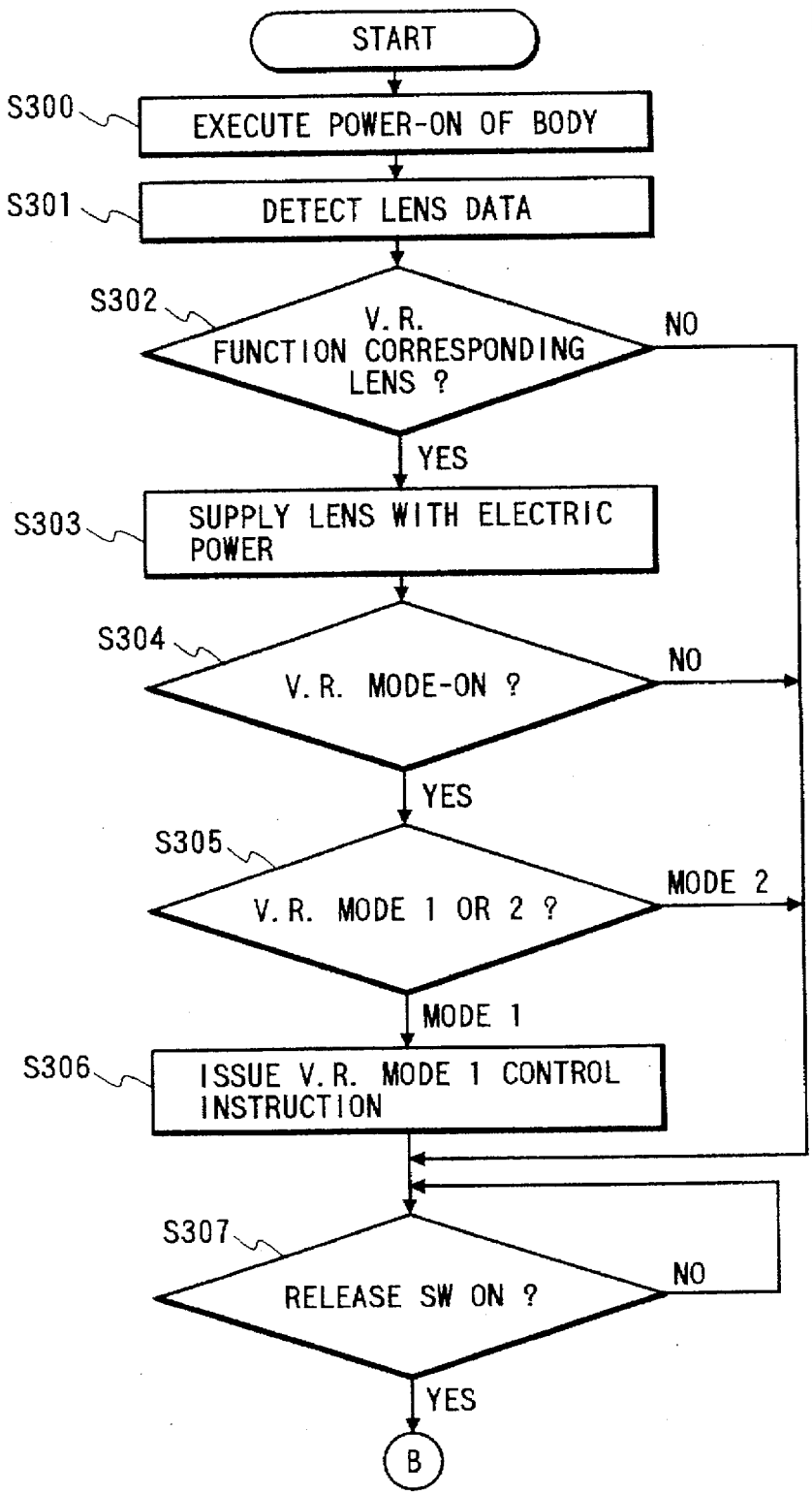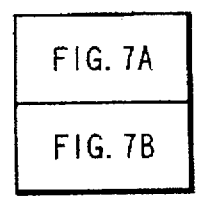

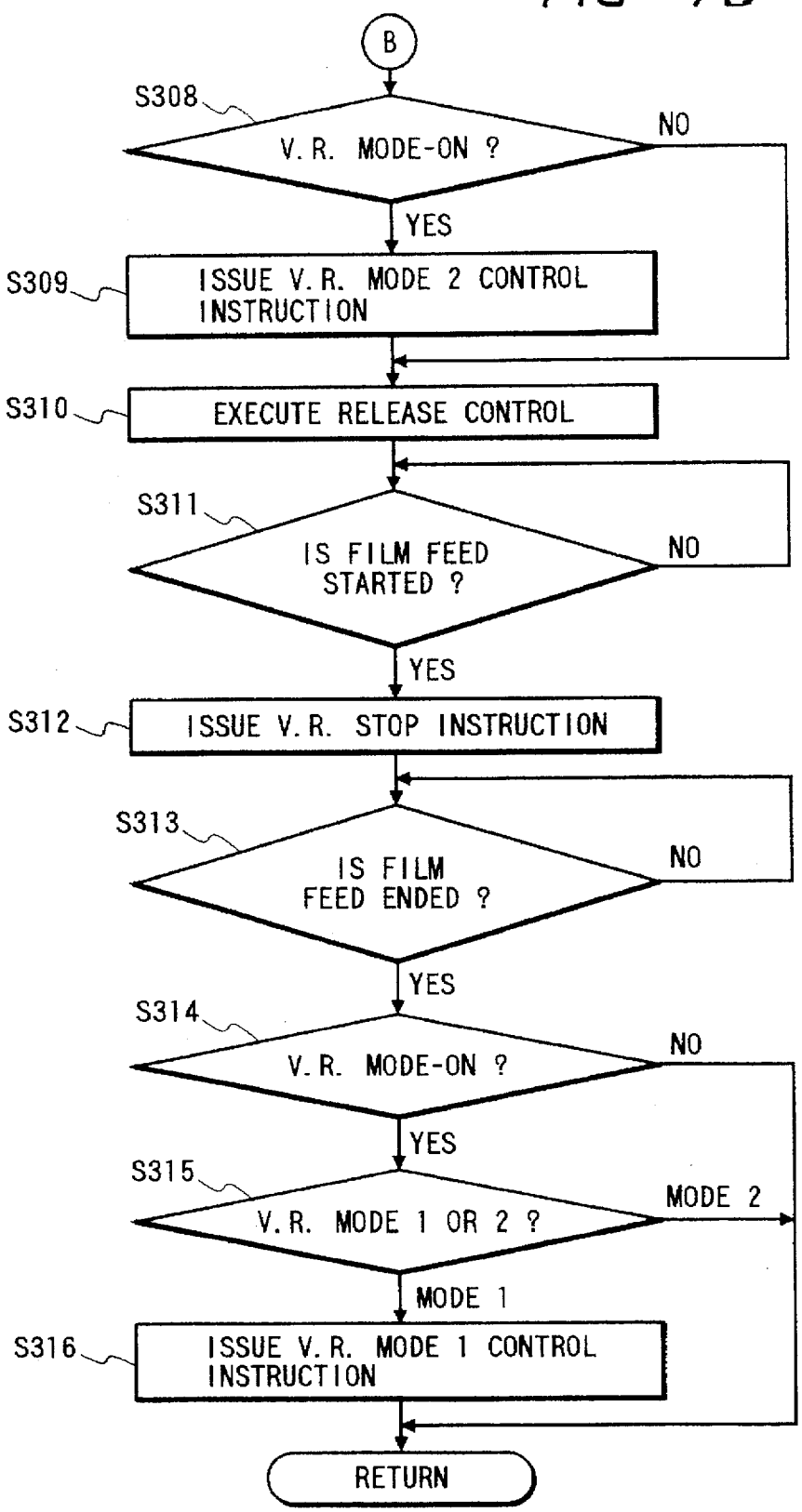

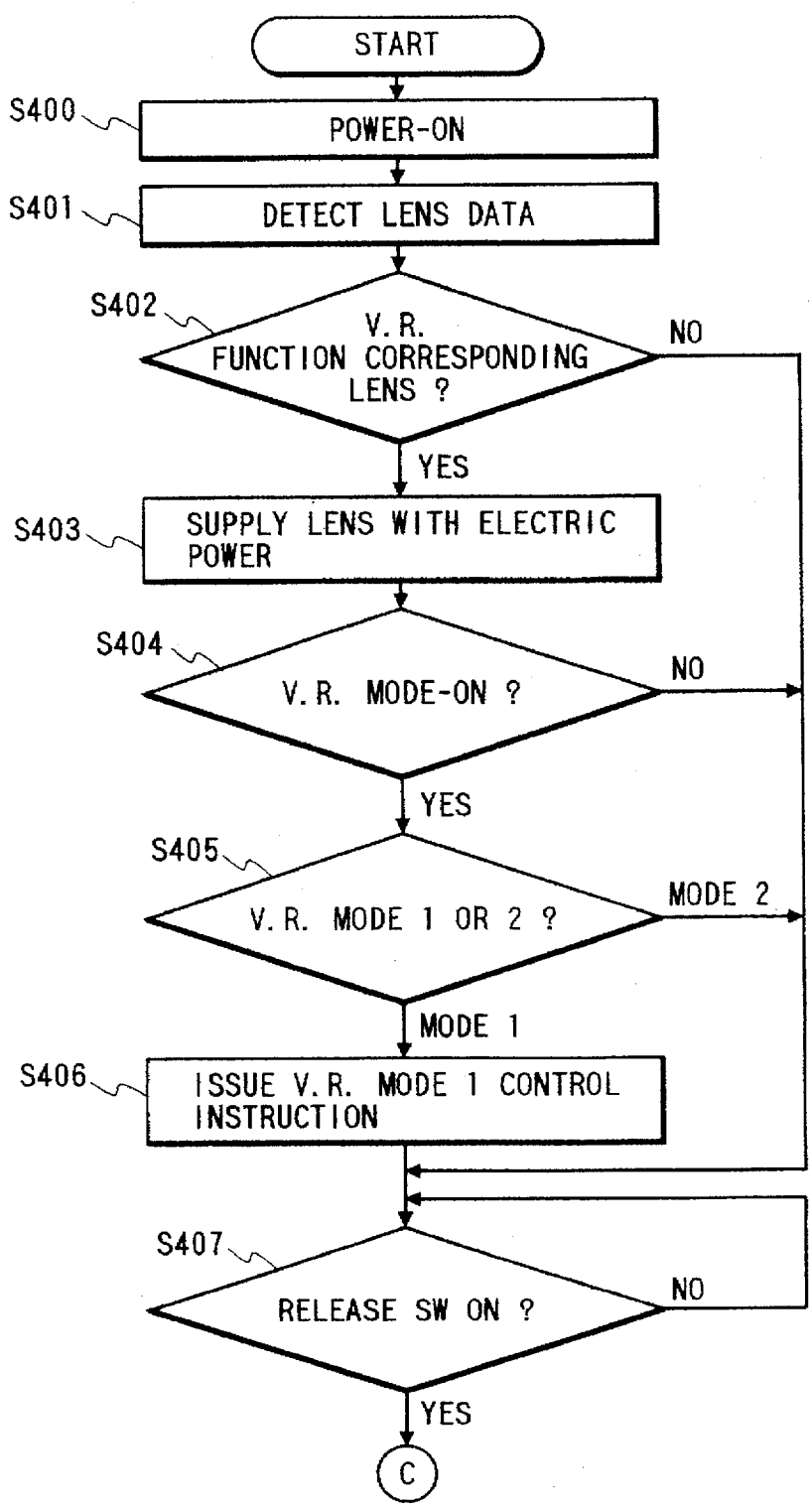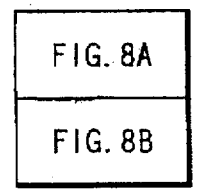

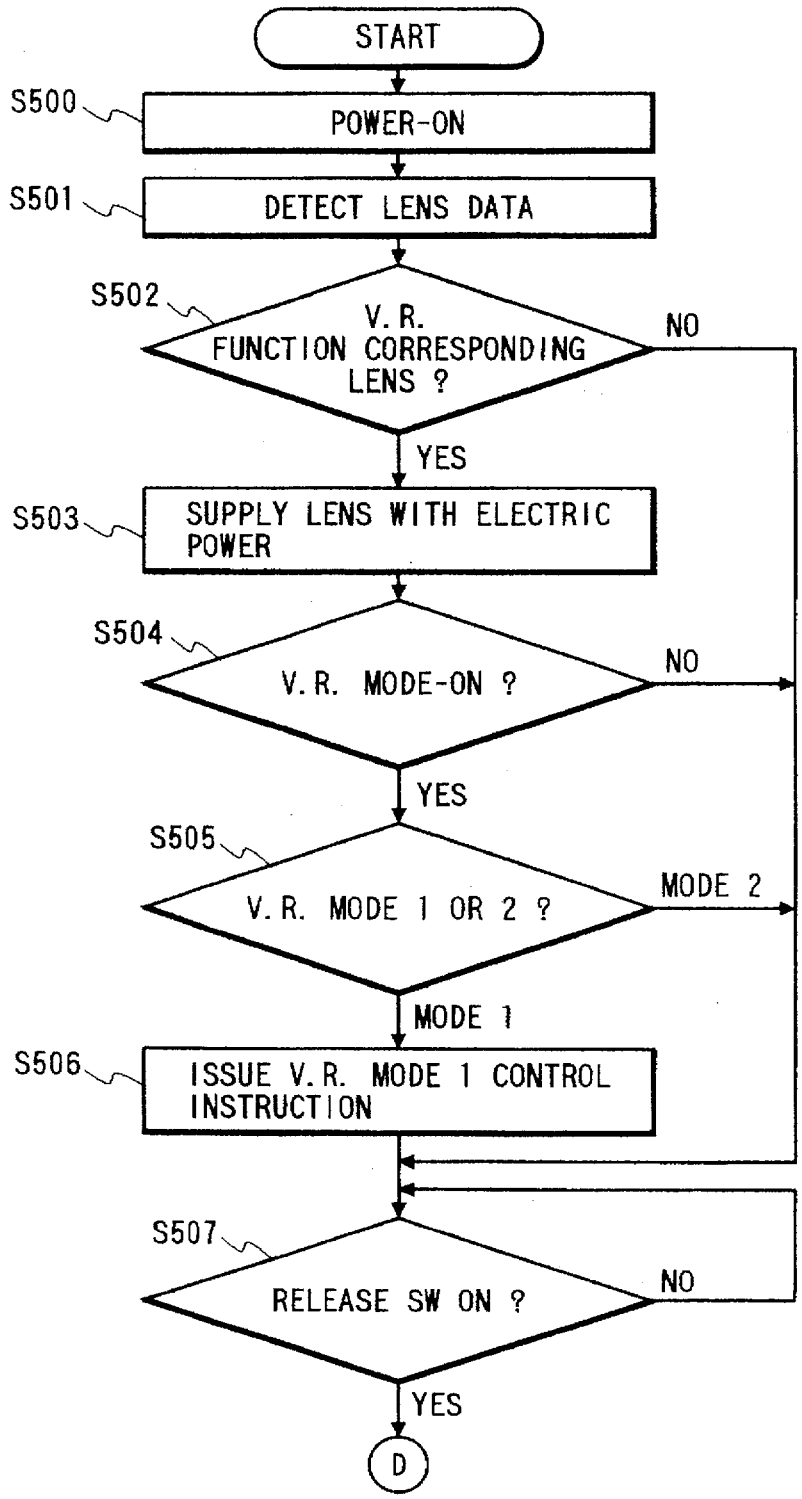
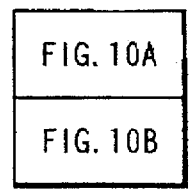
FIG. 10A
FIG. 10

PHOTOGRAPHING APPARATUS HAVING VIBRATION REDUCING MECHANISM

BACKGROUND OF THE INVENTION

1. Field of the Invention

The present invention relates to a photographing apparatus having a vibration reducing mechanism.

2. Related Background Art

An AF mechanism has hitherto been popularized in a photographing apparatus such as, e.g., a camera, etc., and in recent years, there has been proposed such a contrivance that a vibration reducing mechanism for reducing vibration ascribed to a camera shake is further added to the above-mentioned photographing apparatus.

The vibration reducing mechanism detects an angular fluctuation of an optical axis that is attributed to the camera shake or the like, and reduces a blur of a photographed image by shifting the vibration reducing mechanism on the basis of a result of this detection. Japanese Patent Appln. Laid-Open No. 2-66535 discloses an example of an image blur reducing photographing apparatus in which a vibration reducing mechanism is simply added to a single-lens optical system. Japanese Patent Appln. Laid-Open No. 2-183217 discloses an example of reducing the image blur by shifting a part of a photographing optical system of an inner focus type telephoto lens.

When such a vibration reducing mechanism is applied to the photographing apparatus including a preparatory flash mechanism for preventing a pink-eye, there arises a such a problem that if a preparatory flash control mode for operating the preparatory flash mechanism is selected on the occasion of executing vibration reducing control, a voltage abruptly decreases due to a consumption of electric power as a contaminant of the preparatory flashing and the reduction of vibration depending on a value of voltage of a power supply battery common to both of the mechanisms, resulting in an impossibility of normally executing the vibration reducing control.

For example, when taking a portraiture under a condition with a relative deficiency of a light quantity, it is desired that not only the vibration reducing control but also the preparatory flash control be performed. In this case, however, the voltage of the power supply battery abruptly drops, and, in the worst case, this might lead to a functional stoppage of the photographing apparatus.

Further, in the normal case, the vibration reducing mechanism is driven by the power supply battery built in the camera, and, when executing other sequences (e.g., charging of an electronic flash and driving of a film feed motor) during a drive period of the vibration reducing mechanism, the power supply battery is therefore brought into an excessive load state because of the vibration reducing mechanism being a source of consuming a comparatively large electric power, with the result that the electric power can not be sufficiently supplied to the vibration reducing mechanism and other electric power consuming sources. In the worst case, the voltage of the power supply is reduced enough to stop the function of the camera.

Proposed under such circumstances in Japanese Patent Appln. Laid-Open No. 4-113338 is the invention contrived to detect a state of the voltage of the power supply battery and restrict the supply of the electric power to the vibration reducing mechanism or a photographing preparatory operation down to, approximately 50% of a value during the normal drive on the basis of a value of the above detection.

Further, although not intended to reduce the consumption of the electric power, there has been proposed a method (e.g., Japanese Patent Appln. Laid-Open No. 5-66444) of saving the electric power as result of moderating a start and a stop of an AF focusing drive and decreasing a mirror-up speed within a camera body for preventing a shock upon a deflection detecting sensor.

The invention disclosed in Japanese Patent Appln. Laid-Open No. 4-113328, however, has the following problems.

(1) There is no possibility of exerting an influence on a blur of the photo taken even when restricting the vibration reducing control in a time other than a film exposure. However, if the vibration reducing control is restricted during the film exposure, a direct influence is exerted on the blur of the photo taken. According to the invention disclosed in Japanese Patent Appln. Laid-Open No. 4-113338, the vibration reducing control is restricted depending on the state of the voltage of the power supply battery even when the film is exposed, and consequently a blur is produced on the photo taken.

(2) If a large current is consumed instantly in a state where the voltage of the power supply battery decreases, an abrupt reduction in voltage is caused corresponding to a voltage drop quantity calculated as a product of the electric current and an internal resistance of the power supply battery. According to the invention disclosed in Japanese Patent Appln. Laid-Open No. 4-113338, after the voltage of the power supply battery actually has decreased, the vibration reducing control is restricted by detecting a value of this decrease. Hence, there can be neither prevented the occurrence of the decreases in the voltage nor obviated possibilities of malfunction and of abnormality in the control due to the sudden drop of the voltage applied to a CPU for performing a variety of control operations of the photographing apparatus.

(3) According to the invention disclosed in Japanese Patent Appln. Laid-Open No. 4-113338, after the voltage of the power supply battery has actually decreased, the vibration reducing control is restricted. Therefore, a life-span of the battery is shortened, and a frequency of replacing the battery increases. It is therefore considered that the vibration reducing control can be normally executed during the actual photography.

Further, according to a method disclosed in Japanese Patent Appln. Laid-Open No. 5-66444, a maximum speed of the AF focusing drive remains unchanged, and it can be therefore said that an effect of reducing the consumption of the electric power is small.

Then, an essential item overlooked in the proposals given above is a consideration toward saving the electricity during the photography. That is, in a situation where the image blur is required to be reduced, normally, a frequency of photographing with a low-speed shutter increases, and therefore saving the electricity during the photography is also a matter of question.

SUMMARY OF THE INVENTION

It is a primary object of the present invention, which was contrived to obviate the problems inherent in the prior arts described above, to provide a photographing apparatus having a vibration reducing mechanism that includes a drive control method capable of exhibiting an electricity saving effect also in a situation where vibration is required to be reduced and elongating a life-span of a power supply battery.

According to a first aspect of the present invention, a photographing apparatus having a vibration reducing mechanism comprises a photographing optical system, a preparatory flash device for preventing a pink-eye, and a vibration reducing mechanism for detecting a deflection quantity of an optical axis of the photographing optical system and moving a whole or a part of the photographing optical system relatively to a photographing picture. The photographing apparatus has a function of stopping the preparatory flash device when the vibration reducing mechanism is in an operable state.

In this case, it is desirable that the photographing apparatus further has a function of detecting a voltage of a drive power supply for the vibration reducing mechanism and for the preparatory flash device and, when the detected voltage is sufficient, operating the preparatory flash device together with the vibration reducing mechanism, or operating the vibration reducing mechanism together with the preparatory flash device. Further, a photographing apparatus desirably has a function capable of manually selecting an operation of the vibration reducing mechanism and/or the preparatory flash device. Preferably, in the photographing apparatus, when manually selecting the operations of the vibration reducing mechanism and the preparatory flash device, a control device indicates an alarm in the case of selecting any one of the operations.

According to a second aspect of the present invention, a photographing apparatus having a vibration reducing mechanism, comprises a photographing optical system, a preparatory flash device for preventing a pink-eye, and a vibration reducing mechanism for detecting a vibration quantity of an optical axis of the photographing optical system and moving a whole or a part of the photographing optical system relatively to a photographing picture. The photographing apparatus has a function of stopping the vibration reducing mechanism when the preparatory flash device is in an operable state.

In this case, the photographing apparatus desirably has a function of detecting a voltage of a drive power supply for the vibration reducing mechanism and for the preparatory flash device and, when the detected voltage is sufficient, operating the preparatory flash device together with the vibration reducing mechanism, or operating the vibration reducing mechanism together with the preparatory flash device. Further, the photographing device desirably has a function capable of manually selecting an operation of the vibration reducing mechanism and/or the preparatory flash device. Preferably, in the photographing apparatus, when manually selecting the operations of the vibration reducing mechanism and the preparatory flash device, a control device indicates an alarm in the case of selecting any one of the operations.

According to a third aspect of the present invention, a photographing apparatus having a vibration reducing mechanism comprises a photographing optical system, a vibration reducing mechanism for detecting a vibration quantity of an optical axis of the photographing optical system and moving a whole or a part of the photographing optical system relatively to a photographing picture on the basis of the detected vibration quantity, and at least one electric power consuming source operating independently of each other or in relation to each other. The photographing apparatus has a control device for stopping or restraining an operation of the vibration reducing mechanism when at least the one electric power consuming source operates.

In this case, the control device desirably resets the operation of the vibration reducing mechanism when the electric power consuming source stops after stopping or restraining the operation of the vibration reducing mechanism. Furthermore, the timing is an operation timing of a film feed motor and/or a mirror-down drive timing of a shutter. That is, both an operation timing of a film feed motor and a mirror-down drive timing of a shutter are timings when the vibration reducing mechanism is not required to be driven, and timings when large electric power may be consumed. If the vibration reducing mechanism is stopped during these timings, the consumption of the electric power can be restrained without reducing the vibration reducing effect. Moreover, a complicated device such as a device for detecting the consumed electric power is not required, and hence costs for manufacturing can be also reduced.

According to a fourth aspect of the present invention, a photographing apparatus having a vibration reducing mechanism comprises a photographing optical system, a vibration reducing mechanism for detecting a vibration quantity of an optical axis of the photographing optical system and moving a whole or a part of the photographing optical system relatively to a photographing picture on the basis of the detected vibration quantity, and at least one electric power consuming source operating independently of each other or in relation to each other. The photographing apparatus has a control device which prevents the two or more electric power consuming sources from being driven simultaneously after finishing a film exposure when the vibration reducing mechanism is in an operable state.

In this case, the electric power consuming source is a motor for driving a mechanism member. Further, a combination of two or more driving motors that are not simultaneously driven is a combination of a film feed motor for winding and rewinding a film, and a sequence control motor for driving other mechanical members. Moreover, the sequence control motor for driving other mechanical members includes a mirror-up and mirror-down driving motor or a shutter curtain tripping motor.

According to a fifth aspect of the present invention, a photographing apparatus having a vibration reducing mechanism comprises a first driving mechanism for reducing vibration, other second driving mechanisms provided in the vicinity of a lens, a setting switch for setting and inputting whether or not the vibration should be reduced, and a drive control unit for controlling a drive of only the second drive mechanism, or performing the drive control inclusive of the drive control of the first drive mechanism in accordance with a set state of the setting switch. The drive control unit controls the drive of the second drive mechanism in a normal electric power consumption drive mode in the control of the drive of only the second drive mechanism, and on the other hand controls the drive of the second drive mechanism in a power saving drive mode in the drive control inclusive of the drive control of the first drive mechanism.

In this case, the drive control unit desirably executes the drive control so that an operating speed is lower than in the normal electric power consumption drive mode when controlling the second drive mechanism in the power saving drive mode. Alternatively, the drive control unit desirably controls the drive of the second drive mechanism by setting a duty ratio of a drive pulse to a duty ratio lower than in the normal electric power consumption drive mode when controlling the second drive mechanism in the power saving drive mode. Alternatively, the drive control unit desirably controls the drive of the second drive mechanism by setting a speed of the drive pulse slower than in the normal electric power consumption drive mode when controlling the second drive mechanism in the power saving drive mode. Then, the second drive mechanism is desirably a drive mechanism for driving the lens in the optical-axis direction, or a drive mechanism for driving light quantity adjusting blades.

According to a sixth aspect of the present invention, a photographing apparatus having a vibration reducing mechanism comprises a first drive mechanism for reducing vibration, other second drive mechanisms provided in the vicinity of a lens, a setting switch for setting and inputting whether or not the vibration should be reduced, and a drive control unit for controlling a drive of only the second drive mechanism, or performing the drive control inclusive of the drive control of the first drive mechanism in accordance with a set state of the setting switch. The drive control unit controls the drive of the second drive mechanism in a normal electric power consumption drive mode when controlling the drive of the second drive mechanism.

In this case, the drive control unit desirably executes the drive control so that an operating speed is lower than in the normal electric power consumption drive mode when controlling the second drive mechanism in the power saving drive mode. Alternatively, the drive control unit desirably controls the drive of the second drive mechanism by setting a duty ratio of a drive pulse to a duty ratio lower than in the normal electric power consumption drive mode when controlling the second drive mechanism in the power saving drive mode. Further alternatively, the drive control unit desirably controls the drive of the second drive mechanism by setting a speed of the drive pulse slower than in the normal electric power consumption drive mode when controlling the second drive mechanism in the power saving drive mode. Then, the second drive mechanism is a drive mechanism for driving the lens in the optical-axis direction, or a drive mechanism for driving light quantity adjusting blades.

According to a seventh aspect of the present invention, a photographing apparatus having a vibration reducing mechanism, attachable with a photographing lens having a first drive mechanism for reducing vibration, comprises other second drive mechanisms provided in the vicinity of a lens, a setting switch for setting and inputting whether or not the vibration should be reduced, and a drive control unit for controlling a drive of only the second drive mechanism, or performing the drive control inclusive of the drive control of the first drive mechanism in accordance with a set state of the setting switch. The drive control unit comprises a determining unit for determining whether the photographing lens to be attached has the first drive mechanism for reducing the vibration, and a selecting unit for selecting a drive mode in which the second drive mechanism should be drive-controlled in the normal electric power consumption drive mode or in the power saving drive mode in accordance with a result of the determination made by the determining unit.

In this case, the drive control unit desirably executes the drive control so that an operating speed is lower than in the normal electric power consumption drive mode when controlling the second drive mechanism in the power saving drive mode. Alternatively, the drive control unit controls the drive of the second drive mechanism by setting a duty ratio of a drive pulse to a duty ratio lower than in the normal electric power consumption drive mode when controlling the second drive mechanism in the power saving drive mode. Further alternatively, the drive control unit controls the drive of the second drive mechanism by setting a speed of the drive pulse slower than in the normal electric power consumption drive mode when controlling the second drive mechanism in the power saving drive mode. Then, the second drive mechanism is a drive mechanism for driving the lens in the optical-axis direction, or a drive mechanism for driving light quantity adjusting blades.

According to an eighth aspect of the present invention, a photographing apparatus having a vibration reducing mechanism, comprises a first drive mechanism for reducing vibration, other second drive mechanisms provided in the vicinity of a lens, a setting switch for setting and inputting whether or not the vibration should be reduced, and a drive control unit for controlling a drive of only the second drive mechanism, or performing the drive control inclusive of the drive control of the first drive mechanism in accordance with a set state of the setting switch. The drive control unit controls the drive of the second drive mechanism in a normal electric power consumption drive mode in the control of the drive of only the second drive mechanism, and on the other hand restrains the second drive mechanism from being charged with the electricity in the drive control inclusive of the drive control of the first drive mechanism. In this case, the second drive mechanism is desirably a drive mechanism for driving light quantity adjusting blades.

The fifth through eighth aspects of the present invention will hereinafter be described with reference to FIG. 13.

According to the fifth aspect of the present invention, a drive control unit 54, when a set state of a setting switch 53 is a vibration non-reducing (NON-V.R.) mode, controls the drive of a second drive mechanism 52 in the normal electric power consumption drive mode. On the other hand, when in a vibration reducing (V.R.) mode, the drive control unit 54 controls the drive of the second drive mechanism 52 in the power saving drive mode.

Accordingly, an increase in the consumption of electric current can be restrained, thereby making it possible to elongate a life-span of a battery.

According to the sixth aspect of the present invention, the drive control unit 54 drives the second drive mechanism 52 in the power saving mode. Accordingly, the effect of saving the electricity can be further enhanced.

According to the seventh aspect of the present invention, the drive control unit 54 determines whether or not the photographing lens to be attached is capable of reducing the vibration. If the photographing lens is determined to be capable of reducing the vibration, the drive control unit 54 drives the second drive mechanism 52 in the normal electric power consumption drive mode or in the power saving drive mode. Hence, the augment in the consumption of the electricity can be restrained.

Note that the second drive mechanism 52 is driven in such a situation that the vibration is required to be reduced.

Further, according to the eighth aspect of the present invention, the second drive mechanism 52 is restrained from being charged with the electricity in the drive control inclusive of the drive control of the first drive mechanism 51. It is therefore similarly possible to restrain the increase in the consumption of the electricity.

The above and other objects, features and advantages of the present invention will be explained hereinafter and may be better understood by reference to the drawings and the descriptive matter which follows.

BRIEF DESCRIPTION OF THE DRAWINGS

FIG. 7 is comprised of FIGS. 7A and 7B illustrating a flowchart showing an operation sequence from the power-ON of the body to the end of mirror-down with respect to the relationship between the body control and the vibration reducing control of the body device of the photographing apparatus having the vibration reducing mechanism in the second embodiment;

DESCRIPTION OF THE PREFERRED EMBODIMENTS (First Embodiment)

Figure 1:
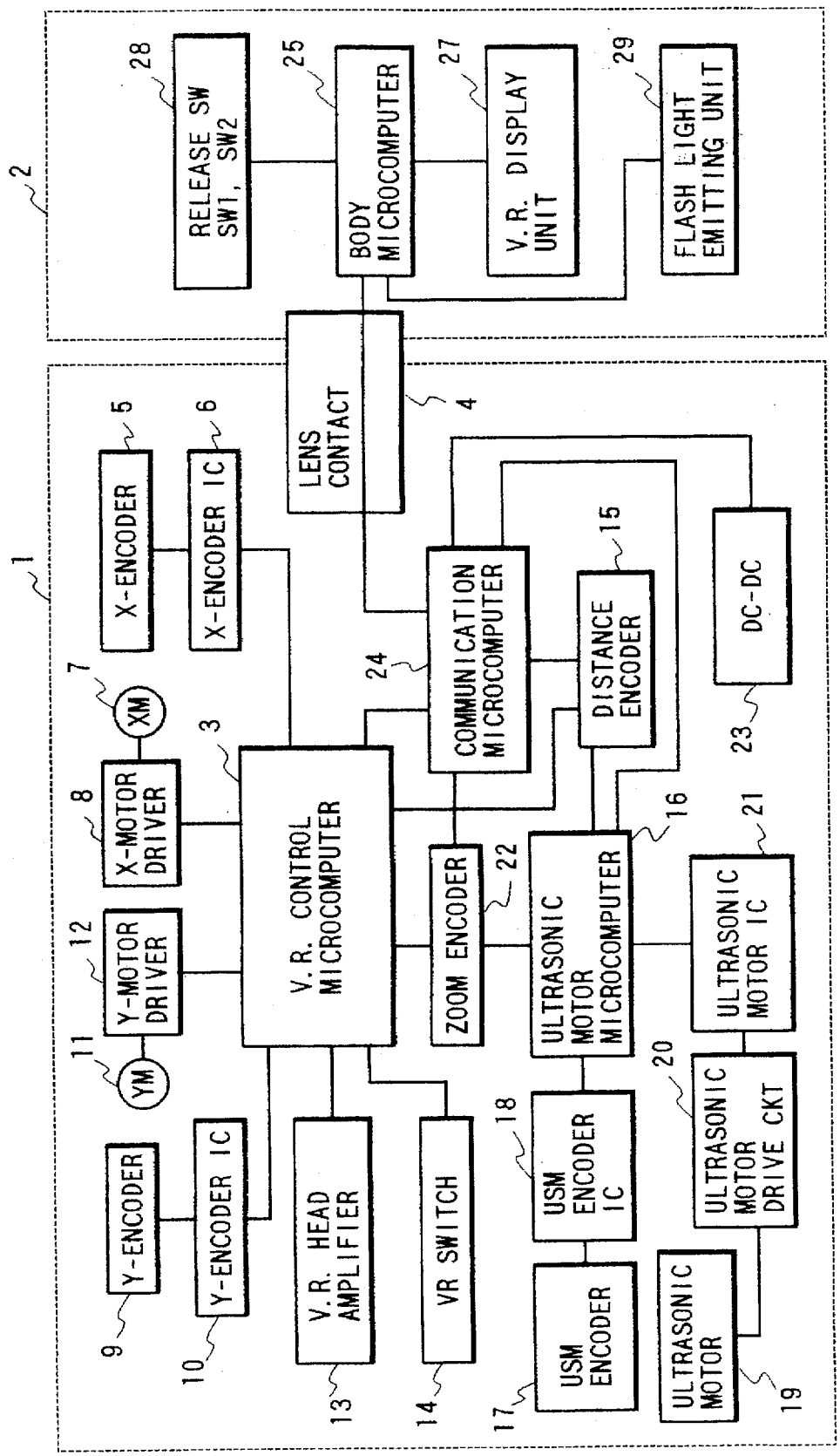
FIG. 1 is a block diagram showing a first embodiment of a photographing apparatus having a vibration reducing mechanism according to the present invention.
Figure 3:
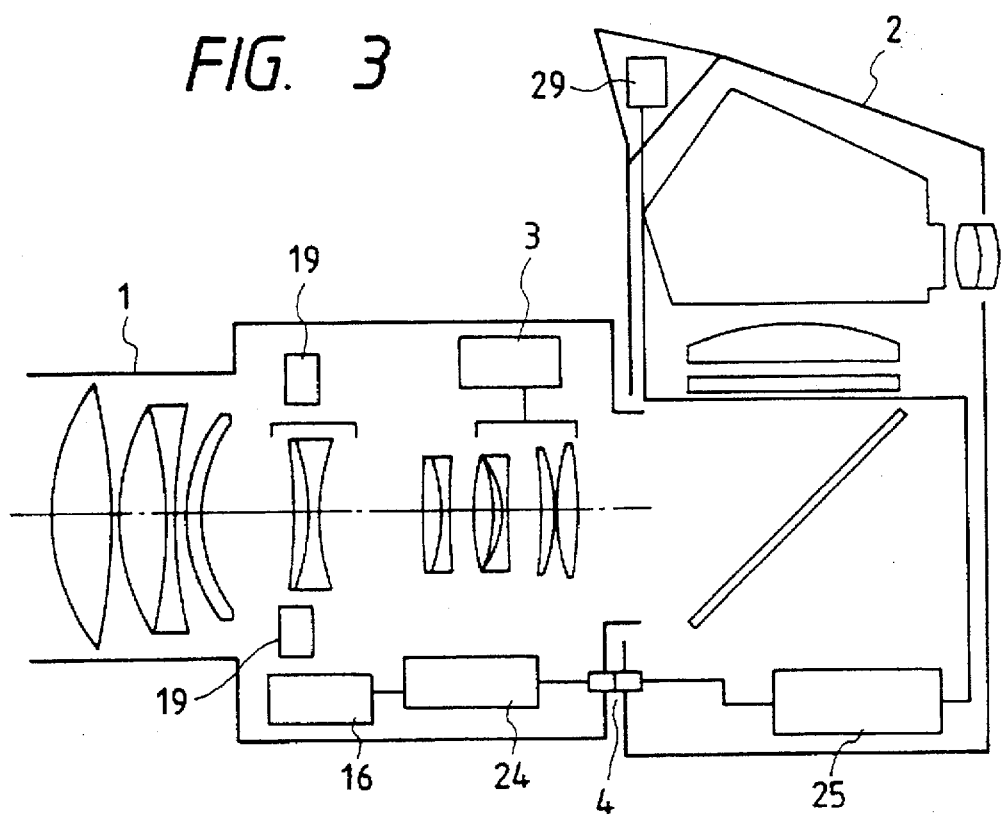
FIG. 3 is a schematic diagram illustrating a construction of the photographing apparatus having a vibration reducing mechanism in the first embodiment.

FIG. 1 is a block diagram showing a first embodiment of a photographing apparatus having a vibration reducing mechanism according to the present invention. FIG. 3 is a schematic view illustrating a construction of the photographing apparatus having the vibration reducing mechanism in the first embodiment.

This vibration reducing mechanism is incorporated into the photographing apparatus constructed of a lens device 1 and a body device 2 (see FIG. 3). As will be stated later on, the vibration reducing mechanism makes a part of a photographing optical system relatively move on the basis of a detected value of a vibration quantity of an optical axis of the photographing optical system. The lens device 1 is provided with a vibration reducing (V.R.) control microcomputer 3, an ultrasonic motor microcomputer 16 and a communication microcomputer 24, and so on. On the other hand, the body device 2 is provided with a body microcomputer 25, and so on. In accordance with the first embodiment, the above-described respective microcomputers are combined to constitute a control device in the present invention.

The vibration reducing control microcomputer 3 controls a drive of a vibration reducing driving unit constructed of an X-axis drive motor 7, an X-axis motor driver 8, a Y-axis drive motor 11 and a Y-axis motor driver 12 on the basis of an output of the body microcomputer 25 of the body device 2 and optical system positional data given from an X-encoder, a Y-encoder 9, a distance encoder 15 and a zoom encoder 22.

A lens contact 4 is an electric contact group used for transferring and receiving signals between the lens device 1 and the body device 2 and is connected to the communication microcomputer 24.

The X-encoder 5 serves to detect an X-axis directional moving quantity of the optical system, and an output of the X-encoder 5 is connected to an X-encoder IC 6. The X-encoder IC 6 serves to convert the X-axis directional moving quantity of the optical system into an electric signal, and this signal is transmitted to the vibration reducing control microcomputer 3. Further, the X-axis drive motor 7 is defined as a drive motor for shift-driving an X-axis vibration reducing optical system. The X-axis motor driver 8 is a circuit for driving the X-axis drive motor 7.

Similarly, the Y-encoder 9 detects a Y-axis directional moving quantity of the optical system, and an output of the Y-encoder 9 is connected to a Y-encoder IC 10. The Y-encoder IC 10 converts the Y-axis directional moving quantity of the optical system into an electric signal, and this signal is transmitted to the vibration control microcomputer 3. The Y-axis drive motor 11 is defined as a drive motor for shift-driving a Y-axis vibration reducing optical system. The Y-axis motor driver 12 is a circuit for driving the Y-axis drive motor 11.

A vibration reducing head amplifier 13 is a circuit for detecting a vibration quantity. The vibration reducing head amplifier 13 converts a piece of image blur data into an electric signal, and this signal is transmitted to the vibration reducing control microcomputer 3. The vibration reducing head amplifier 13 may involve the use of, e.g., an angular speed sensor, etc.

A VR switch 14 is a switch for turning ON/OFF a vibration reducing drive and switching over vibration reducing modes 1 and 2. Herein, for example, the vibration reducing mode 1 is a mode to perform rough control when reducing vibration of a finder image after starting photographing preparation. The vibration reducing mode 2 is a mode to perform precise control when reducing vibration when actually exposed.

The distance encoder 15 is defined as an encoder for detecting a focal position and converting it into an electric signal, and an output of which is similarly connected to the vibration reducing control microcomputer 3, the ultrasonic motor microcomputer 16 and the communication microcomputer 24.

The ultrasonic motor (USM) microcomputer 16 serves to control the ultrasonic motor 19 for driving a focusing optical system driving unit.

A USM encoder 17 is an encoder for detecting a moving quantity of the ultrasonic motor 19, and output of which is connected to a USM encoder IC 18. The USM encoder IC 18 is a circuit for converting a moving quantity of the ultrasonic motor 19 into an electric signal, and this signal is transmitted to the ultrasonic motor microcomputer 16.

The ultrasonic motor 19 is a motor for driving the focusing optical system. An ultrasonic motor driving circuit 20 is a circuit, having an intrinsic driving frequency of the ultrasonic motor 19, for generating two driving signals having a phase difference of 90° with respect to each other. An ultrasonic motor IC 21 is a circuit for interfacing the ultrasonic motor microcomputer 16 with the ultrasonic motor driving circuit 20.

The zoom encoder 22 is an encoder for detecting a lens focal distance position and converting it into an electric signal, and output of which is connected to the vibration reducing control microcomputer 3, the ultrasonic motor microcomputer 16 and the communication microcomputer 24.

A DC/DC converter 23 is a circuit for supplying a DC voltage stable against fluctuations in voltage of a power supply battery and is controlled by the signal transmitted from the communication microcomputer 24.

The communication microcomputer 24 performs communications between the lens device 1 and the body device 2 and transfers instructions to the vibration reducing control microcomputer 3 and the ultrasonic motor microcomputer 16 that are other microcomputers within the lens device 1.

The body microcomputer 25 indicates a vibration reducing (V.R.) display unit 27 to display an alarm by using items of maximum vibration reducing time data, exposure setting data and object luminance data that are transmitted from the lens device 1.

A release switch 28 is provided on the body device 2 and, when a user of the photographing apparatus transfers a start of the exposure control to the body device 2 and designates by a vibration reducing control start switch determining process, determines a transmission timing of a vibration reducing control signal. The release switch 28 is constructed of a half-push switch SW1 for starting the photographing preparatory operation by the photographing apparatus user half-pushing the release button and a full-push switch SW2 for indicating the start of the exposure control by fully pushing the release button.

Further, a flash light emitting unit 29 is provided in the body device 2 and performs both a primary light emission and a preparatory light emission. This flash light emitting unit 29 is used for the flash light emissions (the primary and preparatory light emissions) and for controlling these light emissions.

The photographing apparatus having the vibration reducing device in the first embodiment is constructed as discussed above.

Figure 2:
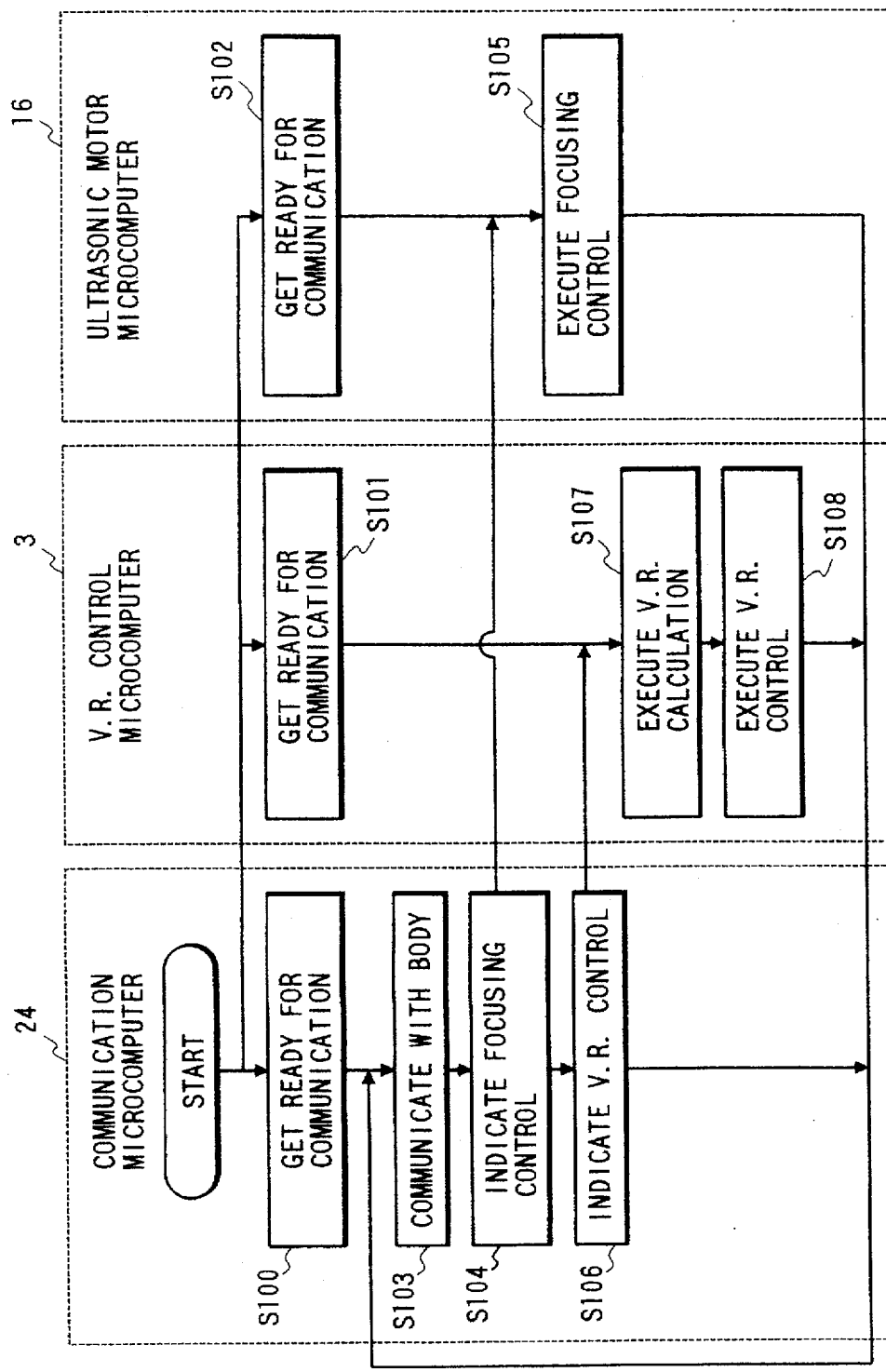
FIG. 2 is a flowchart for explaining an operation sequence of the photographing apparatus in the first embodiment.

FIG. 2 is a flowchart for explaining an operation sequence of the photographing apparatus in the first embodiment.

In step S100, the communication microcomputer 24 gets ready for the communication. Simultaneously with this, the vibration reducing control microcomputer 3 gets ready for the communications in step S101, and the ultrasonic motor microcomputer 16 also gets ready for the communication in step S102.

In step S103, the communication microcomputer 24 communicates with the body device 2 via the lens contact 4.

In step S104, a focusing control indication given from the body device 2 is transmitted to the ultrasonic motor microcomputer 16.

In step S105, the ultrasonic motor microcomputer 16 executes the focusing control on the basis of the data from the zoom encoder 22 and the distance encoder 15, etc.

In step S106, the vibration reducing control indication received from the body device 2 is transmitted to the vibration reducing control microcomputer 3.

In step S107, the vibration reducing control microcomputer 3 executes a vibration reducing calculation.

In step S108, the vibration reducing control microcomputer 3 performs the vibration reducing control.

Figure 4B:
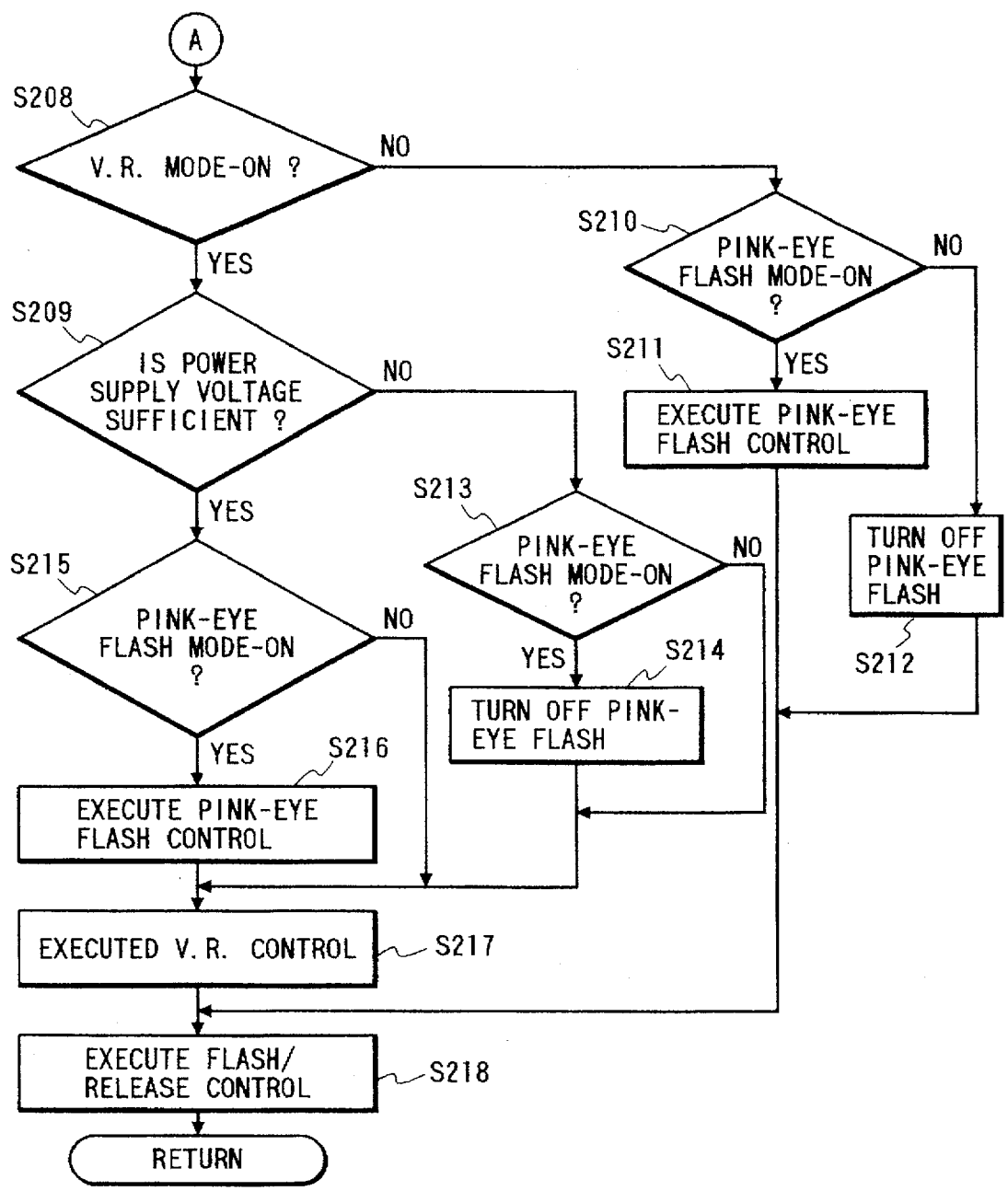
FIG. 4 is comprised of FIGS. 4A and 4B illustrating a flowchart showing an operation sequence from a power-ON of a body to an end of mirror-down with respect to a relationship between body control and vibration reducing control of a body device of the photographing apparatus having the vibration reducing mechanism in the first embodiment.

FIGS. 4A and 4B comprise a flowchart showing an operation sequence down to a mirror-down end process with respect to a relationship between the vibration reducing control and the body control of the body device of the photographing apparatus having the vibration reducing mechanism in the first embodiment. The operation sequence will hereinafter be explained with reference also to FIG. 1.

In step S200, a body power supply is switched ON.

In step S201, the body microcomputer 25 communicates with the communication microcomputer 24 via the lens contact 4 and thus detects the data of the lens device 2.

In step S202, the body microcomputer 25 determines whether or not the lens device 1 is a vibration reducing function corresponding lens on the basis of the lens data obtained in step S201. If not the vibration reducing function corresponding lens, the processing proceeds to a step of determination of the release switch 28 (step S207). If the lens device 1 is the vibration reducing function corresponding lens, the processing proceeds to step S203.

In step S203, the body microcomputer 25 supplies electric power to the lens device 1 via the lens contact 4.

In step S204, the body microcomputer 25 reads a logic of the VR switch 14 and then determines whether the mode is the vibration reducing mode-ON or mode-OFF. If determined to be the vibration reducing mode-OFF, the processing proceeds to a determination of the release switch 28 (step S207). If determined to be the vibration reducing mode-ON, the processing proceeds to step S205.

In step S205, the body microcomputer 25 reads the logic of the VR switch 14 and thereby determines whether the mode is the vibration reducing mode 1 or mode 2.

If determined to be the vibration reducing mode 1, the body microcomputer 25 transmits the control instruction of the vibration reducing mode 1 to the communication microcomputer 24 via the lens contact in step S206. If determined to be the vibration reducing mode 2, the processing proceeds to the determination of the release switch 28 (step S207).

Made in step S207 is an ON-OFF determination of the release switch 28.

In step S208, the body microcomputer 25 reads the logic of the VR switch 14 and thereby determines whether the vibration reducing mode is ON or OFF. If determined to be OFF, the processing proceeds to step S210. If determined to be ON, the processing proceeds to step S209.

In step S210, the body microcomputer 25 determines whether a pink-eye flash mode is selected or not. If the pink-eye flash mode is selected, the processing proceeds to step S211. Whereas if not selected, the processing proceeds to step S212.

In step S211, the body microcomputer 25 performs pink-eye flash control.

In step S212, the body microcomputer 25 does not perform pink-eye flash control.

In step S209, the body microcomputer 25 determines whether the voltage of the power supply battery is sufficient or not. If determined to be sufficient in step S209, the processing proceeds to step S215. Whereas if not sufficient, the processing proceeds to step S213.

In step S213, the body microcomputer 25 determines whether the pink-eye flash mode is selected or not. If the pink-eye flash mode is selected, the processing proceeds to step S214. Whereas if the pink-eye relieving flash mode is not selected, the processing proceeds to step S217.

In step S214, the body microcomputer 25 does not perform the pink-eye control.

In step S215, the body microcomputer 25 determines whether or not the pink-eye flash mode is selected. If the pink-eye flash mode is selected, the processing proceeds to step S216. Whereas if not selected, the processing proceeds to step S217.

In step S216, the body microcomputer 25 executes the pink-eye flash control.

In step S217, the body microcomputer 25 executes the vibration reducing control.

In step S218, the body microcomputer 25 executes primary flash control of the electronic flash and film exposure control.

Thus, in the photographing apparatus having the vibration reducing mechanism in the first embodiment, if the preparatory flash control mode is selected when executing the vibration reducing control, and if the power supply battery is deficient of voltage, the preparatory flash or the vibration reducing control is inhibited, thereby obviating a drop in the voltage of the power supply, which drop is ascribed to consumption of the electric power when effecting the preparatory flash and the vibration reducing control and also obviating an abnormality of the vibration reducing control, which is caused by simultaneously executing the preparatory flash and the vibration reducing control.

(Second Embodiment)

Figure 6:
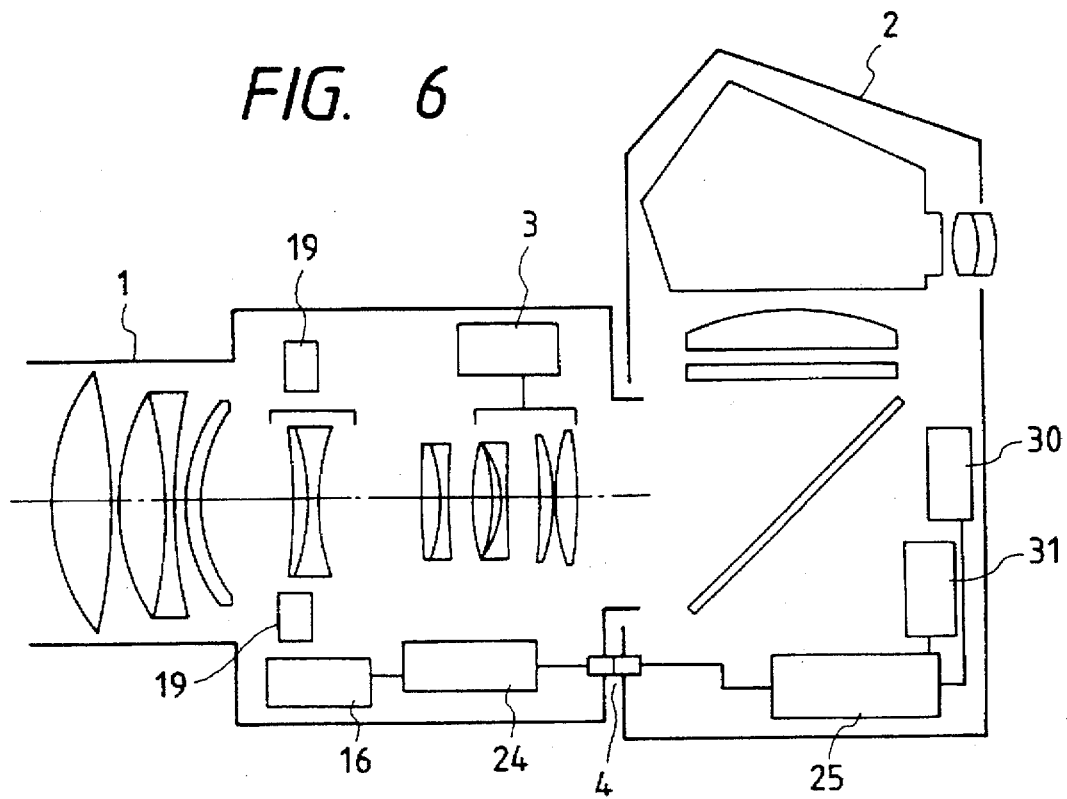
FIG. 6 is a schematic diagram illustrating a construction of the photographing apparatus having the vibration reducing mechanism in a second embodiment.
Figure 5:
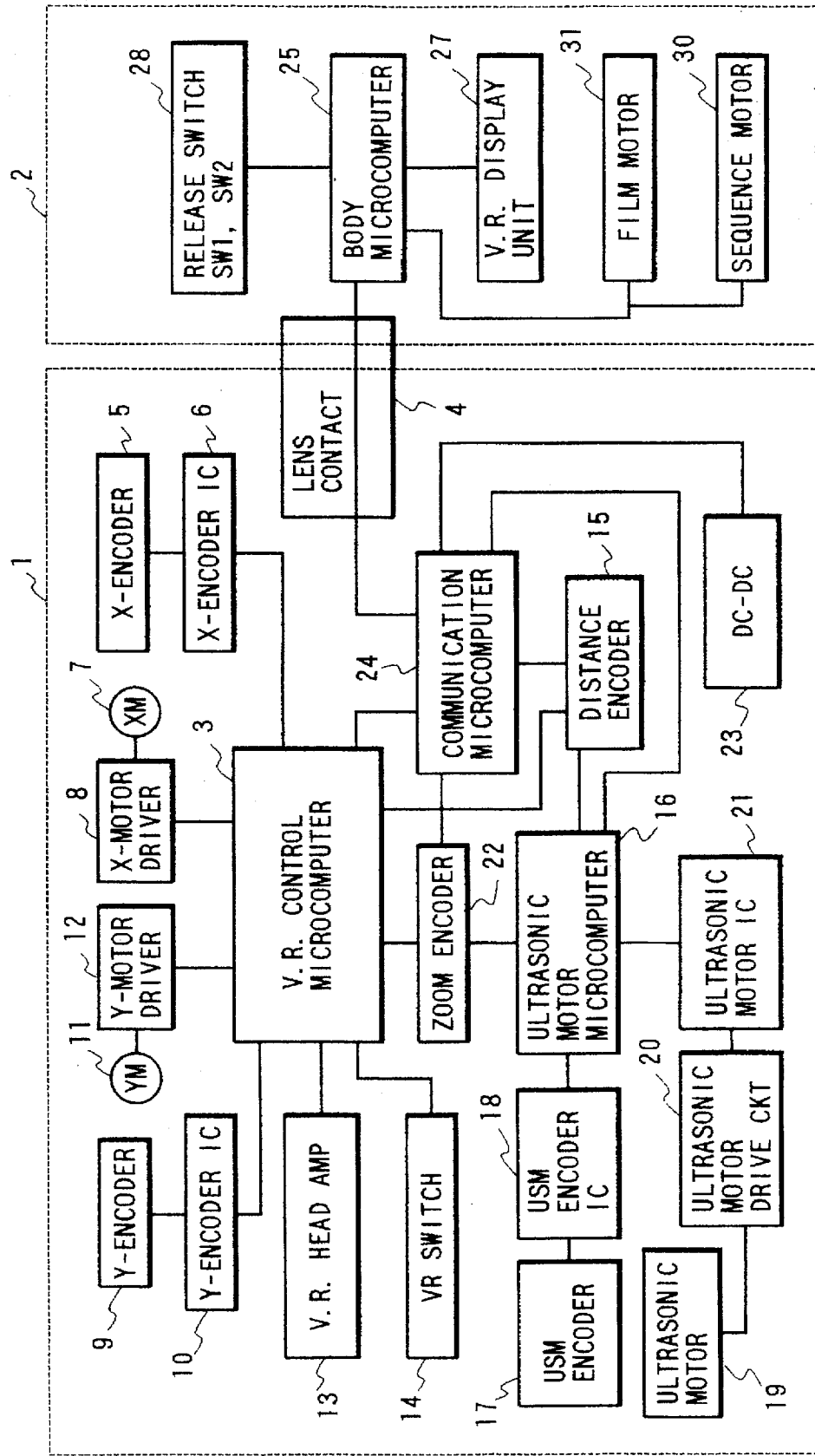
FIG. 5 is a block diagram illustrating a second embodiment of the photographing apparatus having the vibration reducing mechanism according to the present invention.

FIG. 5 is a block diagram showing a second embodiment of the photographing apparatus having the vibration reducing mechanism according to the present invention. FIG. 6 is a schematic view illustrating a construction of the photographing apparatus having the vibration reducing mechanism in the second embodiment. The photographing apparatus in the second embodiment is much the same as the photographing apparatus in the first embodiment except that a sequence motor 30 and a film motor 31 are provided in place of the flash light emitting unit 29 used in the first embodiment discussed above.

The sequence motor 30 is provided into the body device 2 and is, according to the present invention, used for making a shutter mirror flip up and down and charging a shutter curtain, which is a source of consuming the electric power.

The film feed motor 31 is also provided into the body device 2 and is, according to the present invention, used for feeding and rewinding a film, which is also a source of consuming the electric power.

Note that the shutter mirror-up and mirror-down, the charging of the shutter curtain, and the feeding and rewinding of the film are sequence-controlled, and an operation sequence and an operating timing are determined in accordance with the second embodiment.

FIGS. 7A and 7B comprise a flowchart for explaining the operation sequence from the body power-ON down to the end of the mirror-down with respect to the relationship between control of the body device and vibration reducing control of the body device of the photographing apparatus of the present invention. The operation sequence will hereinafter be described with reference to FIGS. 5 and 6.

In step S300, the body power supply is switched ON.

In step S301, the body microcomputer 25 communicates with the communication microcomputer 24 via the lens contact 4 and thus detects the lens data.

In step S302, the body microcomputer 25 determines whether or not the lens device 1 is a vibration reducing function corresponding lens on the basis of the lens data obtained in step S301. If not the vibration reducing function corresponding lens, the processing proceeds to a determination of the release switch 28 in step S307. If the lens device 1 is the vibration reducing function corresponding lens, the processing proceeds to step S303.

In step S303, the body microcomputer 25 supplies the lens device 1 with electric power through the lens contact 4.

In step S304, the body microcomputer 25 reads a logic of the VR switch 14 and then determines whether the mode is the vibration reducing mode-ON or mode-OFF. If determined to be the vibration reducing mode-OFF, the processing proceeds to a determination of the release switch 28. If determined to be the vibration reducing mode-ON, the processing proceeds to step S305.

In step S305, the body microcomputer 25 reads the logic of the VR switch 14 and thereby determines whether in a status of the vibration reducing mode 1 or mode 2.

If determined to be the vibration reducing mode 1, the processing proceeds to step S306. In step S306, the body microcomputer 25 transmits the control instruction of the vibration reducing mode 1 to the communication microcomputer 24 via the lens contact 4.

If determined to be the vibration reducing mode 2, the processing proceeds to the determination of the release switch 28 in step S307.

Made in step S307 is an ON-OFF determination of the release switch 28.

In step S308, the body microcomputer 25 reads the logic of the VR switch 14 and thereby determines whether the mode is the vibration reducing mode-ON or mode-OFF. If determined to be the vibration reducing mode-OFF, the processing proceeds to release control in step S310. If determined to be the vibration reducing mode-ON, the processing proceeds to step S309.

In step S309, the body microcomputer 25 transmits the control instruction of the vibration reducing mode 2 to the communication microcomputer 24 via the lens contact 4.

In step S310, the body microcomputer 25 executes the release control (film exposure control).

In step S311, the body microcomputer 25 determines whether the film feed control is started or not. If the film feed control is started, the processing proceeds to step S312. If not started, the step S311 is once again executed.

In step S312, the body microcomputer 25 transmits a vibration reducing control stop instruction to the communication microcomputer 24 via the lens contact 4.

In step S313, the body microcomputer 25 determines whether or not the film feed control is finished. If the film feed control is finished, the processing proceeds to step S314. If not finished, step S313 is once again executed.

In step S314, the body microcomputer 25 reads the logic of the VR switch 14 and thereby determines whether the mode is the vibration reducing mode-ON or mode-OFF. If determined to be the vibration reducing mode-OFF, the processing is returned. If determined to be the vibration reducing mode-ON, the processing proceeds to step S315.

In step S315, the body microcomputer 25 reads the logic of the VR switch 14 and thereby determines whether a status is of the vibration reducing mode 1 or mode 2.

If determined to be the vibration reducing mode 1, the processing proceeds to step S316. In step S316, the body microcomputer 25 transmits a control instruction of the vibration reducing mode 1 to the communication microcomputer 24 via the lens contact 4. In the case of the vibration reducing mode 2, the processing is returned.

Thus, in accordance with the second embodiment, the operation of the vibration reducing mechanism is stopped during such a period that the film feed motor 31 operates.

The vibration reducing control during the film exposure exerts a direct influence on a blur of a photo taken, whereas the vibration reducing control except during the film exposure exerts no direct influence on the blur of the photo taken. In accordance with the second embodiment, the vibration reducing control is executed during the film exposure, and hence absolutely no influence is exerted on the blur of the photo taken.

Further, when a large electric current is consumed instantly in a state where the voltage of the power supply battery decreases, the control voltage is abruptly reduced, resulting in a functional stoppage of the photographing apparatus in the worst case. In accordance with the second embodiment, however, it is possible to previously avoid an instant large consumption of the electricity when feeding the film, that causes a decrease in the control voltage. It is therefore feasible to obviate a drop in the voltage of the CPU, which is a concomitant of an abrupt remarkable decrease in the control voltage.

Furthermore, in accordance with the second embodiment, the vibration reducing control is stopped when operating the film feed motor 31 irrespective of the power supply voltage, and hence a life-span of the battery can be increased.

Thus, the photographing apparatus having the vibration reducing mechanism in the second embodiment includes the control device for stopping the vibration reducing control when starting the film feed control by the body device and making the vibration reducing control resume when finishing the film feed control. Consequently, it is possible to prevent the occurrence of the drop itself in the voltage of the power supply battery without exerting any adverse influence on the vibration reducing control, and the life-span of the battery can be extended.

(Third Embodiment)

Next, a third embodiment of the present invention will hereinafter be discussed in detail with reference to the accompanying drawings. Note that the explanation will concentrate on only a portion different from the second embodiment, and the repetitive explanations of the same portions marked with the like numerals are adequately omitted in the discussions of the third embodiment and of a fourth embodiment which will be dealt with later on.

In accordance with the third embodiment, as in the second embodiment, there is employed a photographing apparatus having a vibration reducing mechanism shown in FIGS. 5 and 6 according to the present invention, and this photographing apparatus is controlled in the operating sequence shown in FIG. 2.

Figure 8B:
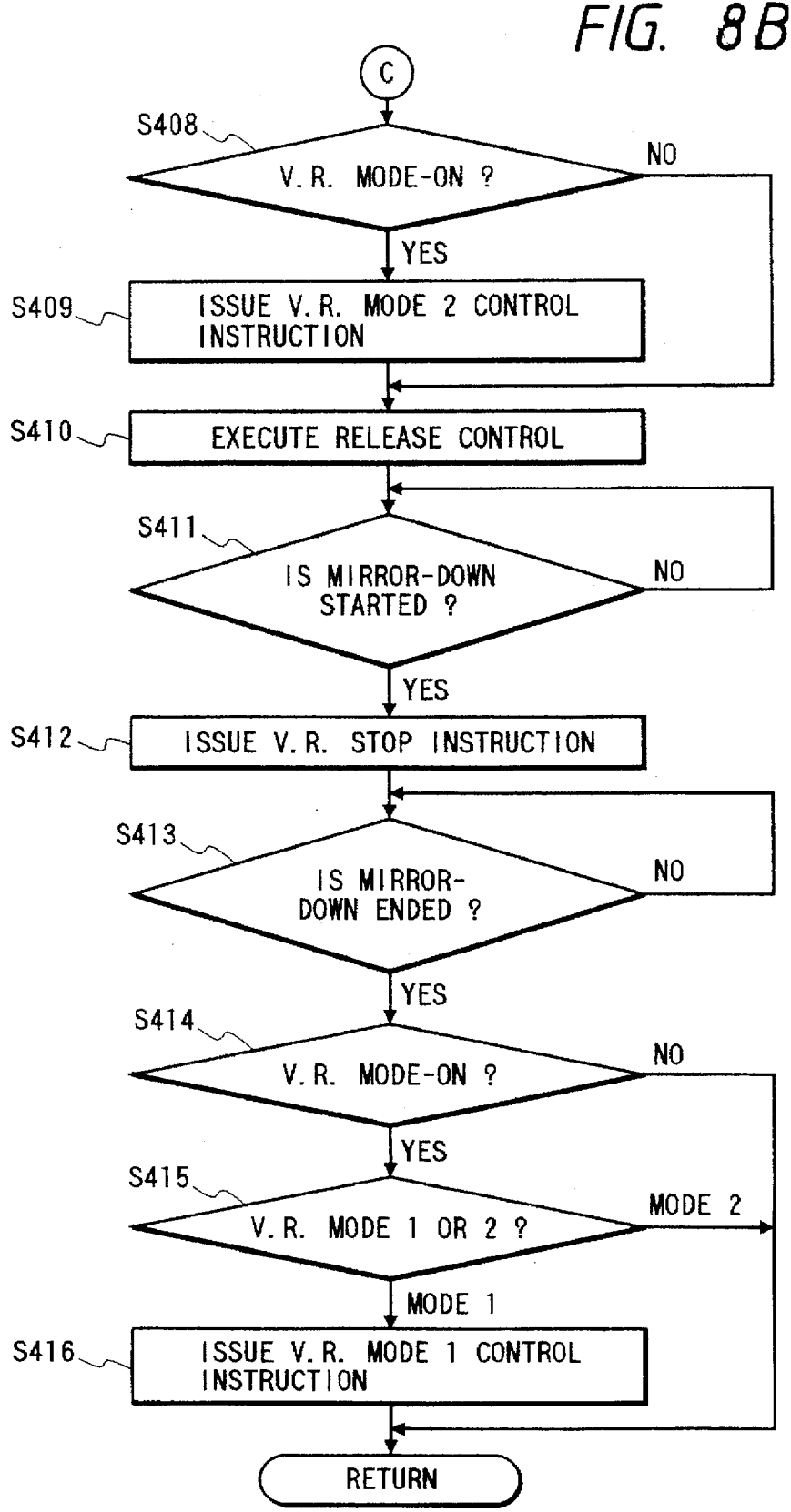
FIG. 8 is comprised of FIGS. 8A and 8B illustrating a flowchart showing an operation sequence from the power-ON of the body to the end of mirror-down with respect to the relationship between the body control and the vibration reducing control of the body device of the photographing apparatus having the vibration reducing mechanism in a third embodiment.

FIGS. 8A and 8B comprise a flowchart for explaining an operating sequence to the end of the mirror-down with respect to a relationship between the body control and vibration reducing control in the body device in the third embodiment.

In step S400, the body power supply is switched ON.

In step S401, the body microcomputer 25 communicates with the communication microcomputer 24 via the lens contact and thus detects the lens data.

In step S402, the body microcomputer 25 determines whether or not the lens device 1 is the vibration reducing function corresponding lens on the basis of the lens data obtained in step S401. If not the vibration reducing function corresponding lens, the processing proceeds to a determination of the release switch 28 in step S407. If the lens device 1 is the vibration reducing function corresponding lens, the processing proceeds to step S403.

In step S403, the body microcomputer 25 supplies the lens device 1 with the electric power through the lens contact 4.

In step S404, the body microcomputer 25 reads the logic of the VR switch 14 and then determines whether the mode is the vibration reducing mode-ON or mode-OFF. If determined to be the vibration reducing mode-OFF, the processing proceeds to a determination of the release switch 28. If determined to be the vibration reducing mode-ON, the processing proceeds to step S405.

In step S405, the body microcomputer 25 reads the logic of the VR switch 14 and thereby determines whether in a status of the vibration reducing mode 1 or mode 2.

If determined to be the vibration reducing mode 1, the processing proceeds to step S406. In step S406, the body microcomputer 25 transmits the control instruction of the vibration reducing mode 1 to the communication microcomputer 24 via the lens contact 4.

If determined to be the vibration reducing mode 2, the processing proceeds to the determination of the release switch 28 in step S407.

Made in step S407 is an ON-OFF determination of the release switch 28.

In step S408, the body microcomputer 25 reads the logic of the VR switch 14 and thereby determines whether the mode is the vibration reducing mode-ON or mode-OFF. If determined to be the vibration reducing mode-OFF, the processing proceeds to release control in step S410. If determined to be the vibration reducing mode-ON, the processing proceeds to step S409.

In step S409, the body microcomputer 25 transmits the control instruction of the vibration reducing mode 2 to the communication microcomputer 24 via the lens contact 4.

In step S410, the body microcomputer 25 executes the release control (film exposure control).

In step S411, the body microcomputer 25 determines whether mirror-down control is started or not. If the mirror-down control is started, the processing proceeds to step S412. If not started, the step S411 is once again executed.

In step S412, the body microcomputer 25 transmits the vibration reducing control stop instruction to the communication microcomputer 24 via the lens contact 4.

In step S413, the body microcomputer 25 determines whether or not the mirror-down control is finished. If the mirror-down control is finished, the processing proceeds to step S414. If not finished, step S413 is once again executed.

In step S414, the body microcomputer 25 reads the logic of the VR switch 14 and thereby determines whether the mode is the vibration reducing mode-ON or mode-OFF. If determined to be the vibration reducing mode-OFF, the processing is returned. If determined to be the vibration reducing mode-ON, the processing proceeds to step S415.

In step S415, the body microcomputer 25 reads the logic of the VR switch 14 and thereby determines whether in a status of the vibration reducing mode 1 or mode 2.

If determined to be the vibration reducing mode 1, the body microcomputer 25 transmits the control instruction of the vibration reducing mode 1 to the communication microcomputer 24 via the lens contact 4. In the case of the vibration reducing mode 2, the processing is returned.

Thus, the photographing apparatus having the vibration reducing mechanism in the third embodiment includes the control device for stopping the vibration reducing control when starting the mirror-down drive control of the shutter of the body device and making the vibration reducing control resume when finishing the mirror-down drive control of the shutter. Consequently, it is possible to prevent the occurrence of the drop itself in the voltage without exerting any adverse influence on the vibration reducing control, and the life-span of the battery can be extended.

Figure 9:
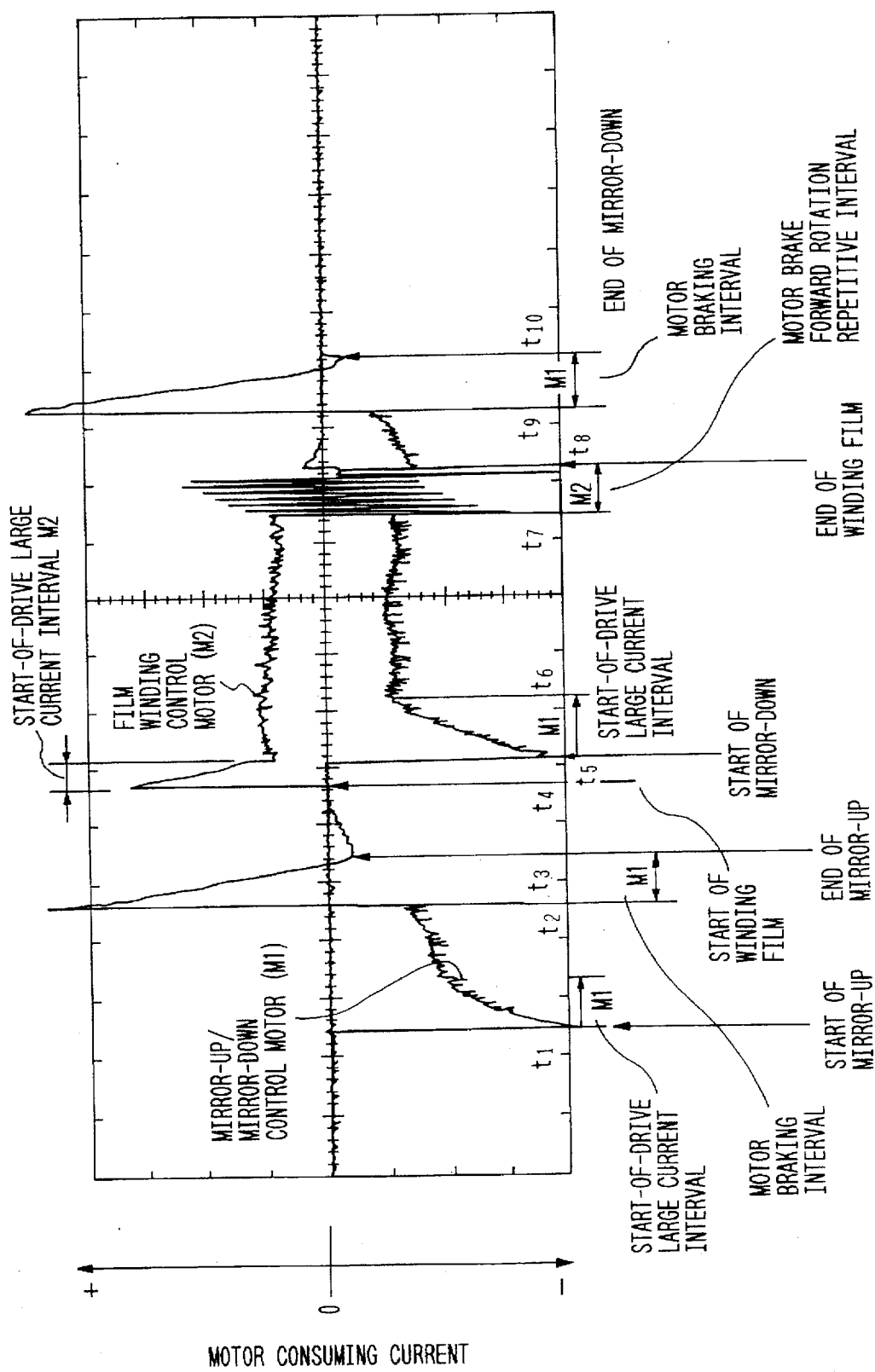
FIG. 9 is a graphic chart showing one example of relationships between a camera photographing timing, a film feed motor, a sequence motor and a consumption current.

Note that FIG. 9 is a graphic chart showing one example of relationships between photographing timings of the camera and the electric currents consumed by each of the film feed motor and the sequence motor.

As seen in the graphic chart of FIG. 9, when the mirror-up is started at a timing $t_1$, a large current abruptly flows across the sequence motor, and a value of the current gradually decreases. At a timing $t_2$ defined as a timing of start of a motor brake interval, a reversal large current flows. At a timing $t_3$ defined as an end of the motor brake interval, a weak current flows, and the current value is zeroed toward a timing $t_5$.

Subsequently, the mirror-down is started at the timing $t_5$. Then, the large current flows across the sequence motor, and the current value gradually decreases toward a timing $t_6$. A substantially fixed value is kept from the timing $t_6$ to a timing $t_9$. The motor brake works at the timing $t_9$, and the large current flows across the sequence motor, thus finishing the mirror-down at a timing $t_{10}$.

That is, the large current runs across the sequence motor immediately after starting the mirror-up, when effecting the motor brake corresponding thereto, when starting the mirror-down and when performing the motor brake corresponding thereto. A time just before the exposure is, however, a time immediately after starting the mirror-up and is also a motor braking time corresponding thereto. According to the present invention, a restraint or a stoppage of the operation of the vibration reducing mechanism probably undesirably exerts an adverse influence on the operation of the vibration reducing mechanism during the exposure. Under such circumstances, according to the present invention, it is desirable that the mirror-down starting time and the motor braking time corresponding thereto be set.

On the other hand, in the graphic chart shown in FIG. 9, when winding the film is started at the timing $t_4$, the large current runs across the film feed motor, and the current value gradually decreases at the timing $t_5$. Further, the electric current having a substantially fixed value flows from the timing $t_5$ to the timing $t_7$. The motor brake works from the timing $t_7$ to the timing $t_8$, and the film winding comes to an end at the timing $t_8$.

Namely, the time when the large current flows across the film feed motor is immediately after starting the film winding and is the motor braking time corresponding thereto. Therefore, according to the present invention, it is desirable that the operation of the vibration reducing mechanism be restrained or stopped when driving the film feed motor.

(Fourth Embodiment)

A fourth embodiment is an embodiment relative to a fourth aspect of the present invention. The fourth embodiment is characterized by such a point that the film feed motor for winding and rewinding the film, and the sequence control motor for driving other mechanical members, are not simultaneously driven after finishing the film exposure if the vibration reducing mode is selected, these motors being built in the body device of the photographing apparatus.

In accordance with the fourth embodiment, as in the second embodiment, the photographing apparatus having the vibration reducing mechanism shown in FIGS. 5 and 6 according to the present invention is employed and controlled in the operation sequence shown in FIG. 2.

Figure 10B:
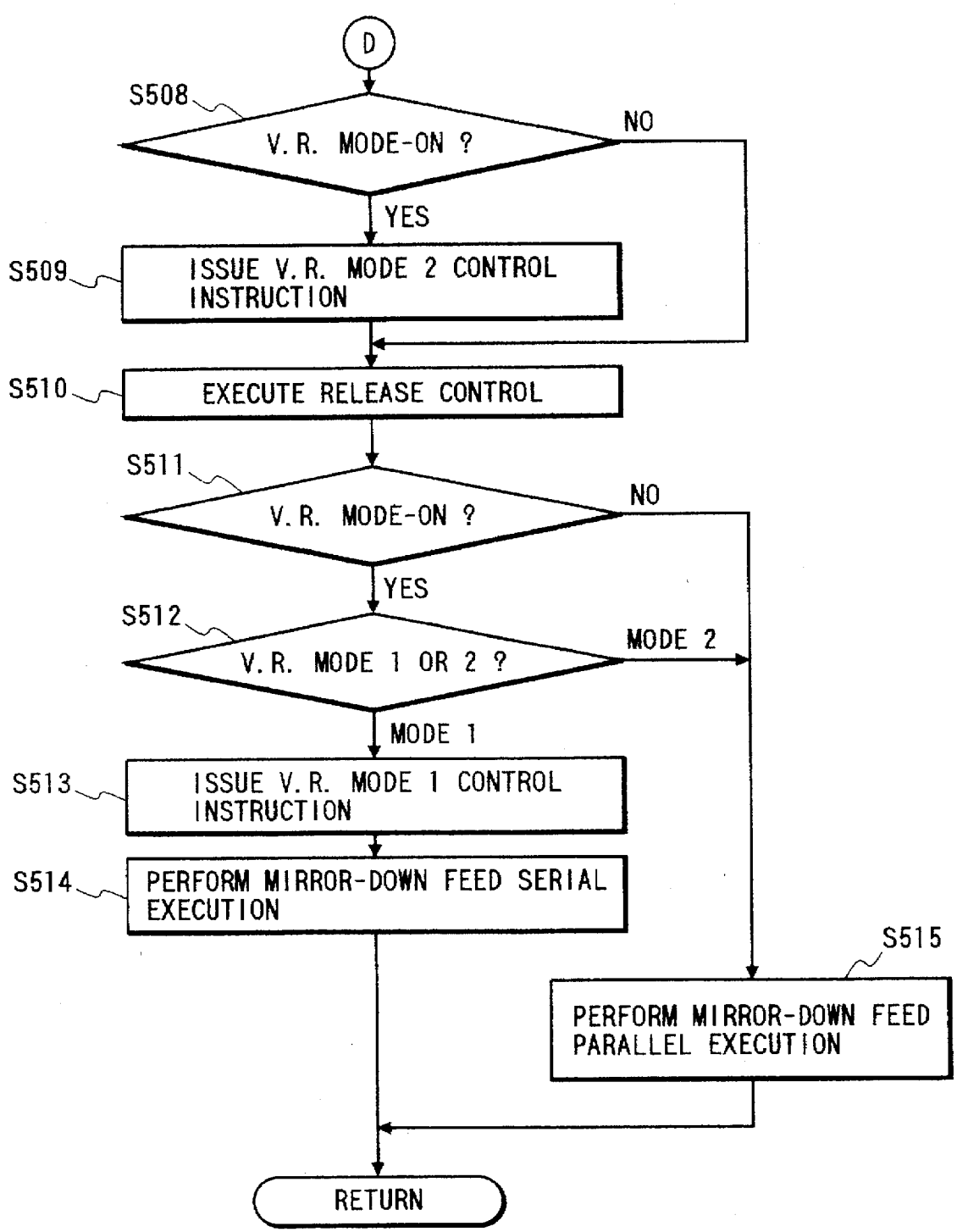
FIG. 10 is comprised of FIGS. 10A and 10B illustrating a flowchart showing an operation sequence from the power-ON of the body to the end of mirror-down with respect to the relationship between the body control and the vibration reducing control of the body device of the photographing apparatus having the vibration reducing mechanism in a fourth embodiment.

FIGS. 10A and 10B comprise a flowchart for explaining the operation sequence to the end of the mirror-down with respect to a relationship between the body control and the vibration reducing control in the body device.

Steps S500 (power-ON of the body device 2) through S510 (release control) in FIGS. 10A and 10B are absolutely the same as steps S400 (power-ON of the body device 2) through S410 (release control), and therefore explanations thereof will be omitted.

Executed, upon a start of the release control, in step S510 is control of processing from a start of the mirror-up of the sequence control motor up to tripping of a second shutter curtain (2 Mg).

In step S511, the body microcomputer 25 reads the logic of the VR switch 14 and thereby determines whether the mode is the vibration reducing mode-ON or mode-OFF. If determined to be the vibration reducing mode-ON, the processing proceeds to step S512. If not determined to be the vibration reducing mode-ON, this indicates a case of less amount of consumption of the power supply, and therefore the processing proceeds to step S515, wherein operations of the mirror-down, mechanical member driving control and the film feed control are simultaneously executed.

In step S512, the body microcomputer 25 reads the logic of the VR switch 14 and thereby determines whether in a status of the vibration reducing mode 1 or mode 2. Then, the processing proceeds to step S513.

In step S513, the body microcomputer 25 transmits the control instruction of the vibration reducing mode 1 to the communication microcomputer 24 via the lens contact 4.

In step S514, after finishing the control of the sequence control motor such as the mirror-down and the mechanical charge control, the film feed control is executed.

Figure 11:
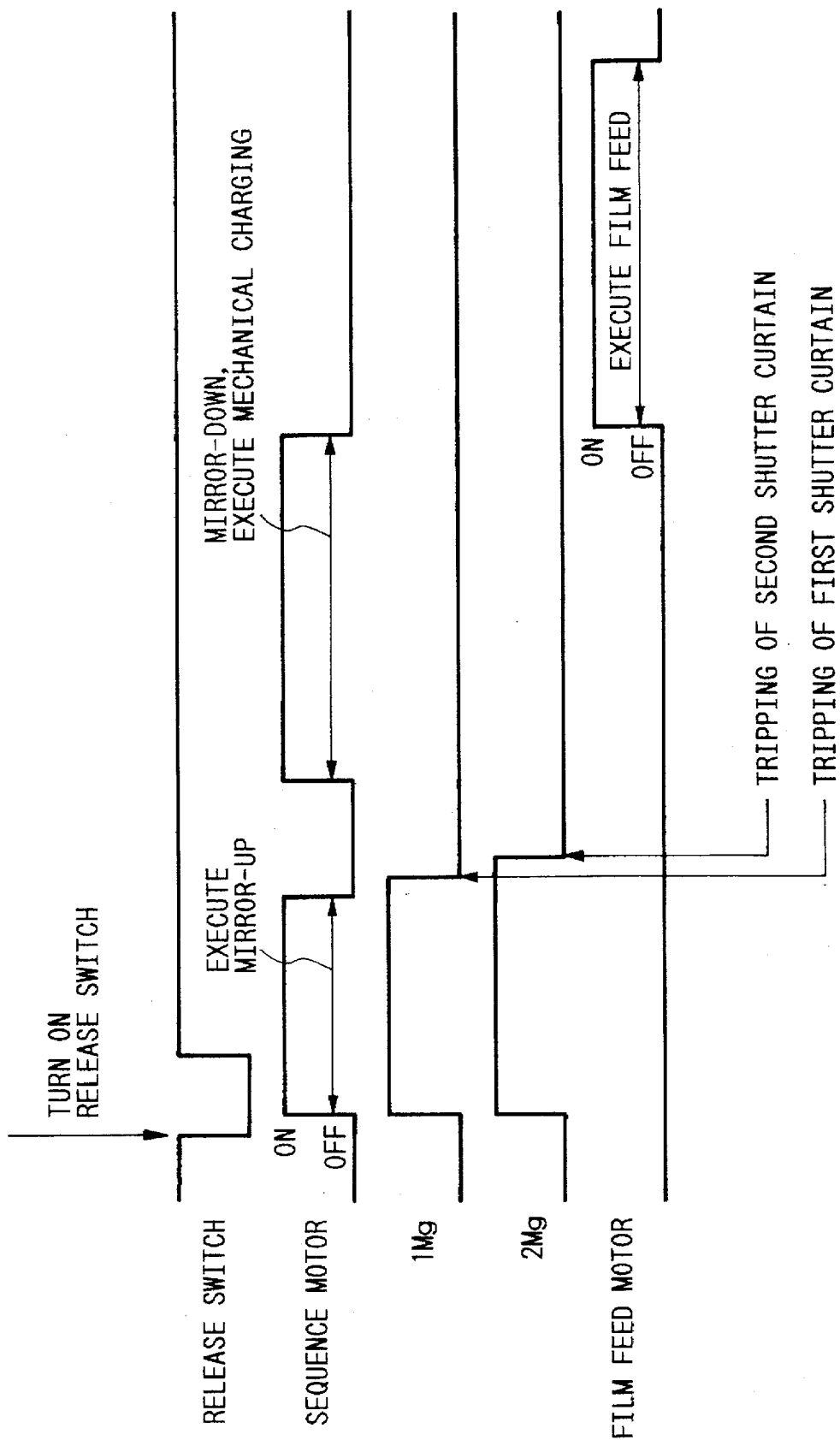
FIG. 11 is a time chart showing one example of the control in step S514 of FIG. 10B.

FIG. 11 is a time chart showing one example of the control in step S514. As shown in FIG. 11, after turning ON the release switch, there are executed the mirror-up, the mirror-down, the mechanical charging and the film feed. In this case, however, the vibration reducing mechanism having a large consumption of the electric power is in the working state, and hence the film feed control is carried out after finishing the control of the sequence control motor such as the mirror-down and the mechanical charge control in order to restrain an abrupt remarkable reduction in the electric power.

Performed in step S515 is the film feed control simultaneously with the control of the sequence control motor such as the mirror-down and the mechanical charge control.

Figure 12:
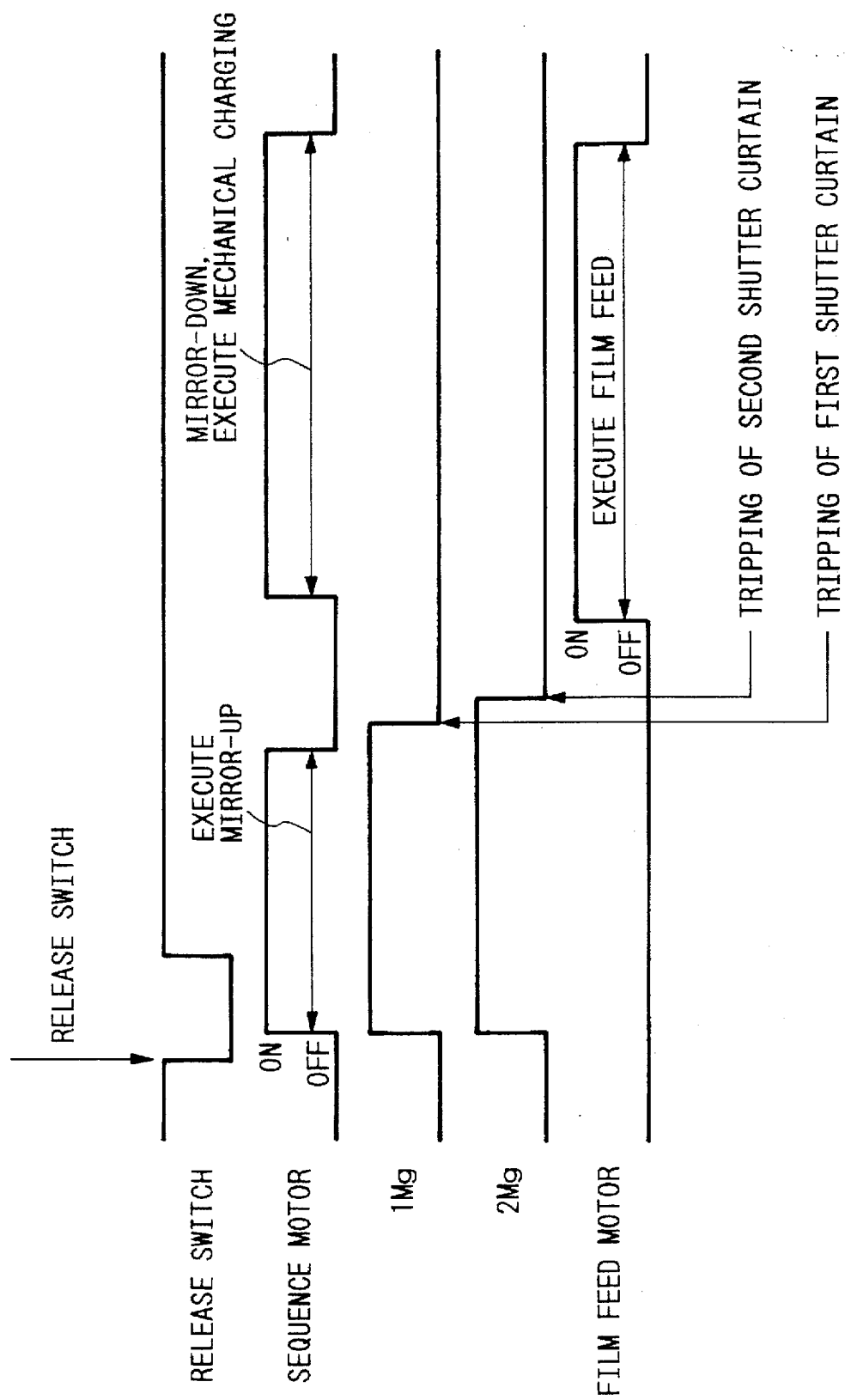
FIG. 12 is a time chart showing one example of the control in step S515 of FIG. 10B.
Figure 13:
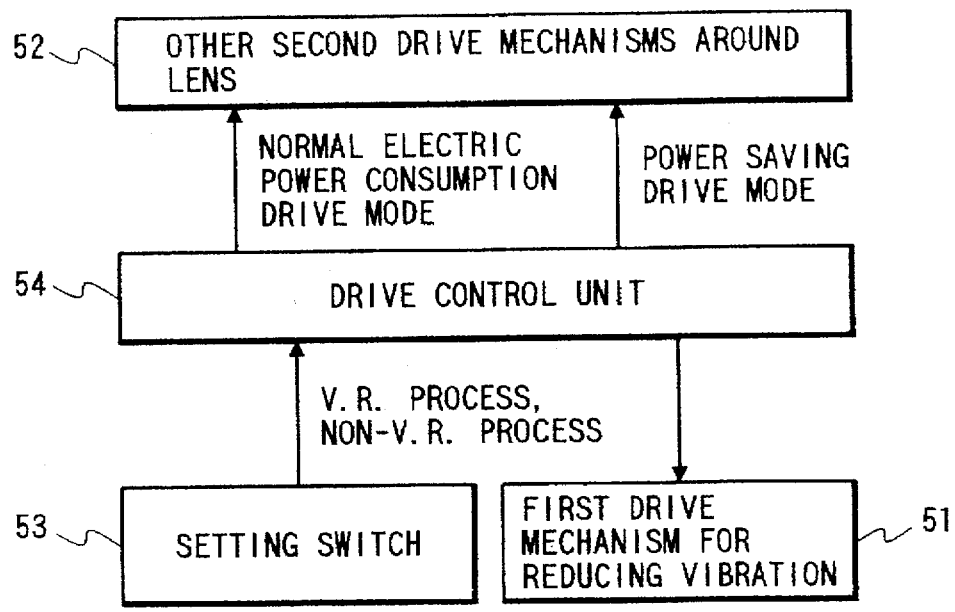
FIG. 13 is a block diagram for explaining the principles of the fifth through eighth aspects of the present invention.

FIG. 12 is a time chart showing one example of the control in step S515. As shown in FIG. 12, the vibration reducing mechanism having the large consumption of electric power is not in the operating state in this case, and therefore the film feed control is executed simultaneously with the control of the sequence control motor such as the mirror-down and the mechanical charge control.

Thus, in accordance with the fourth embodiment, if the vibration reducing mechanism is in the operable state, the film feed motor for winding and rewinding the film and the sequence control motor for driving other mechanical members are not simultaneously driven after finishing the film exposure. It is therefore possible to drive another sequence control motor without interrupting the vibration reducing control, to restrain the consumption of the electricity from the power supply, and to consecutively smoothly control the vibration reducing control.

(Fifth Embodiment)

A fifth embodiment of the present invention will hereinafter be described in detail with reference to the accompanying drawings.

Figure 15:
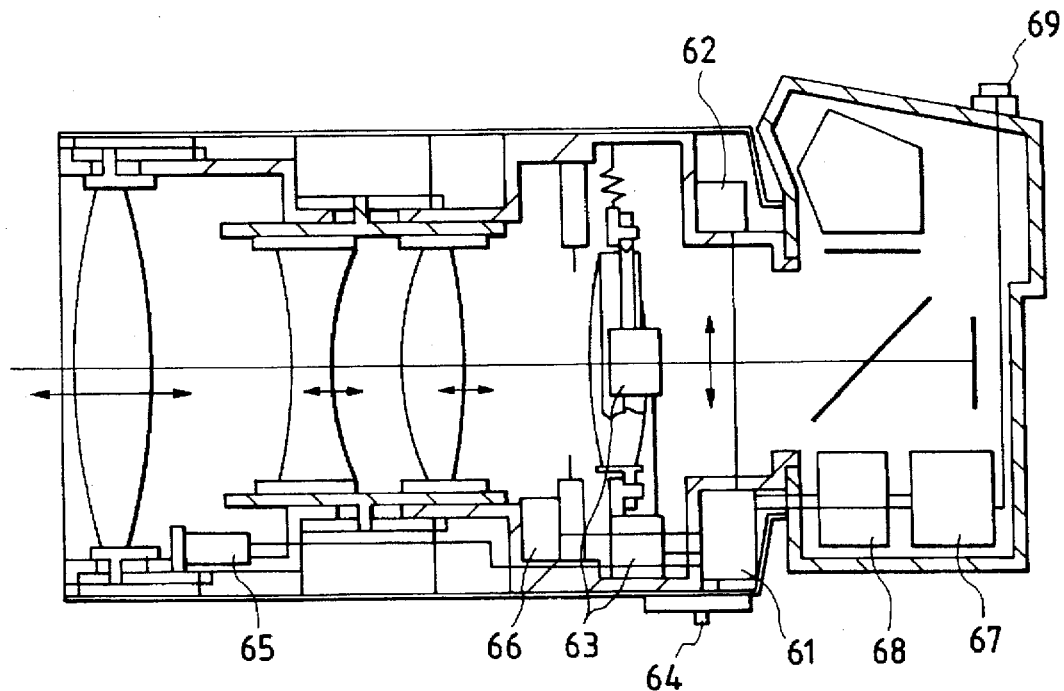
FIG. 15 is a schematic diagram showing a construction of the photographing apparatus having the vibration reducing mechanism in a fifth embodiment.
Figure 14:
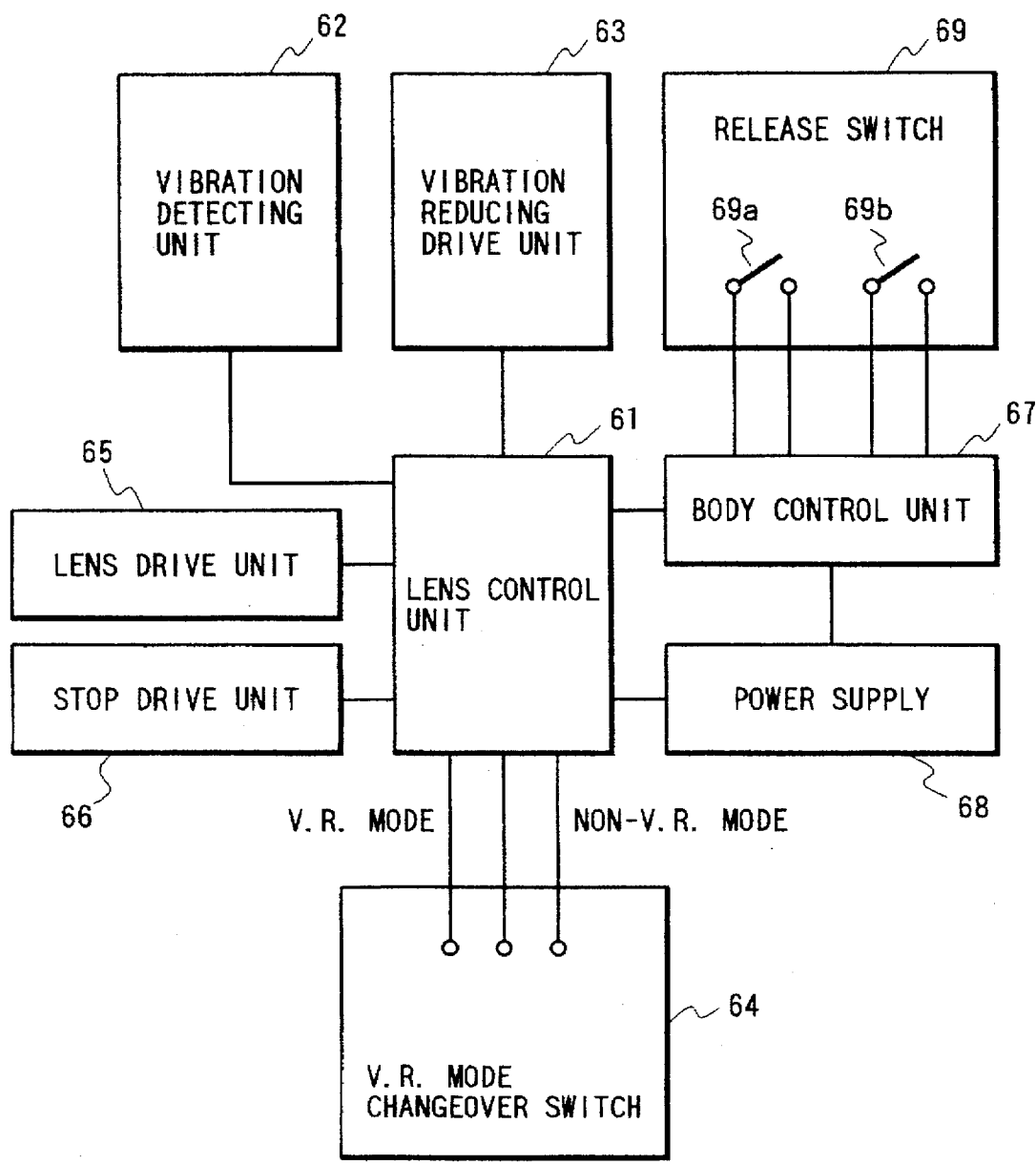
FIG. 14 is a block diagram illustrating a fifth embodiment of the photographing apparatus having the vibration reducing mechanism according to the present invention.

Referring to FIGS. 14 and 15, the photographing apparatus having the vibration reducing mechanism in the fifth embodiment includes a lens control unit 61, a vibration detecting unit 62 connected to the lens control unit 61, a vibration reducing unit 63, a vibration reducing mode changeover switch 64, a lens moving unit 65, a stop driving unit 66, a body control unit 67, a power supply 68, and a release switch 69 connected to the body control unit 67.

The lens control unit 61 is provided in the lens barrel and constructed of a microcomputer (MCU) for controlling a drive of an actuator within the lens barrel.

The vibration detecting unit 62 detects a vibration of the photographing apparatus and transmits a content of the detection to the lens control unit 61. A known piezoelectric vibration gyro is suitable as a vibration sensor.

A vibration reducing drive unit 63 is, as illustrated in FIG. 15, drive-controlled by the lens control unit 61 on the basis of an output of the vibration detecting unit 62 in order to drive a mechanism for shifting a lens element (image vibration reducing optical system) as a part of a photographing optical system for the purpose of reducing the vibration.

Illustrated in FIG. 15 are two actuators for shifting the lens element both in vertical directions and in lateral directions. This lens element may be shifted directly by a coil combined with, e.g., a magnet or by a DC motor combined with a screw or a cam.

The vibration reducing mode changeover switch 64 is a switch for setting a changeover of a "vibration reducing mode" for driving the vibration reducing drive unit 63 and a "vibration non-reducing mode" for not driving the vibration reducing drive unit 63 during a photographic preparation or during the photographing. It is desirable that the switch 64 be a status retentive switch as in the case of a slide switch.

The lens moving unit 65 is drive-controlled by the lens control unit 61 in order to perform a focusing movement of the photographing optical system. The lens moving unit 65 preferably may involve the use of a DC motor or an ultrasonic motor.

The stop driving unit 66 is drive-controlled by the lens control unit 61 to adjust a light quantity when photographed. A stepping motor or the like may be suitable as the stop driving unit 66.

The body control unit 67 is provided within the body of the unillustrated photographing apparatus and performs actuator drive control, detects a focal position and executes an exposure calculation within the body. Further, the body control unit 67 communicates with the lens control unit 61 via a connection contact and thus controls entire operations of the photographing apparatus. This body control unit 67 is constructed of a microcomputer unit (MCU), and so on.

The power supply 68 is a battery power supply. This power supply 68 is illustrated such that the power supply 68 is connected to the lens control unit 61 and to the body control unit 67. The power supply, however, supplies the electric power to the respective units such as the vibration detecting unit 62, the vibration reducing drive unit 63, the lens moving unit 65 and the stop driving unit 66 under the control of the lens control unit 61.

The release switch 69 is connected to the body control unit 67 and has a "half-depression switch" 69a for starting the photography preparatory operation and a "full-depression switch" 69b for starting the photographing operation.

In the above-described construction, the following are corresponding relationships to the fifth through eighth aspects of the present invention.

A first driving mechanism 51 for reducing the vibration corresponds to the vibration reducing drive unit 63. Second driving mechanisms 52 as other mechanisms in the vicinity of the lens element correspond to the lens moving unit 65 and the stop driving unit 66.

A setting switch 53 corresponds to the vibration reducing mode changeover switch 64. A drive control unit 54 corresponds to the whole of the lens control unit 61 and the body control unit 67.

Figure 16:
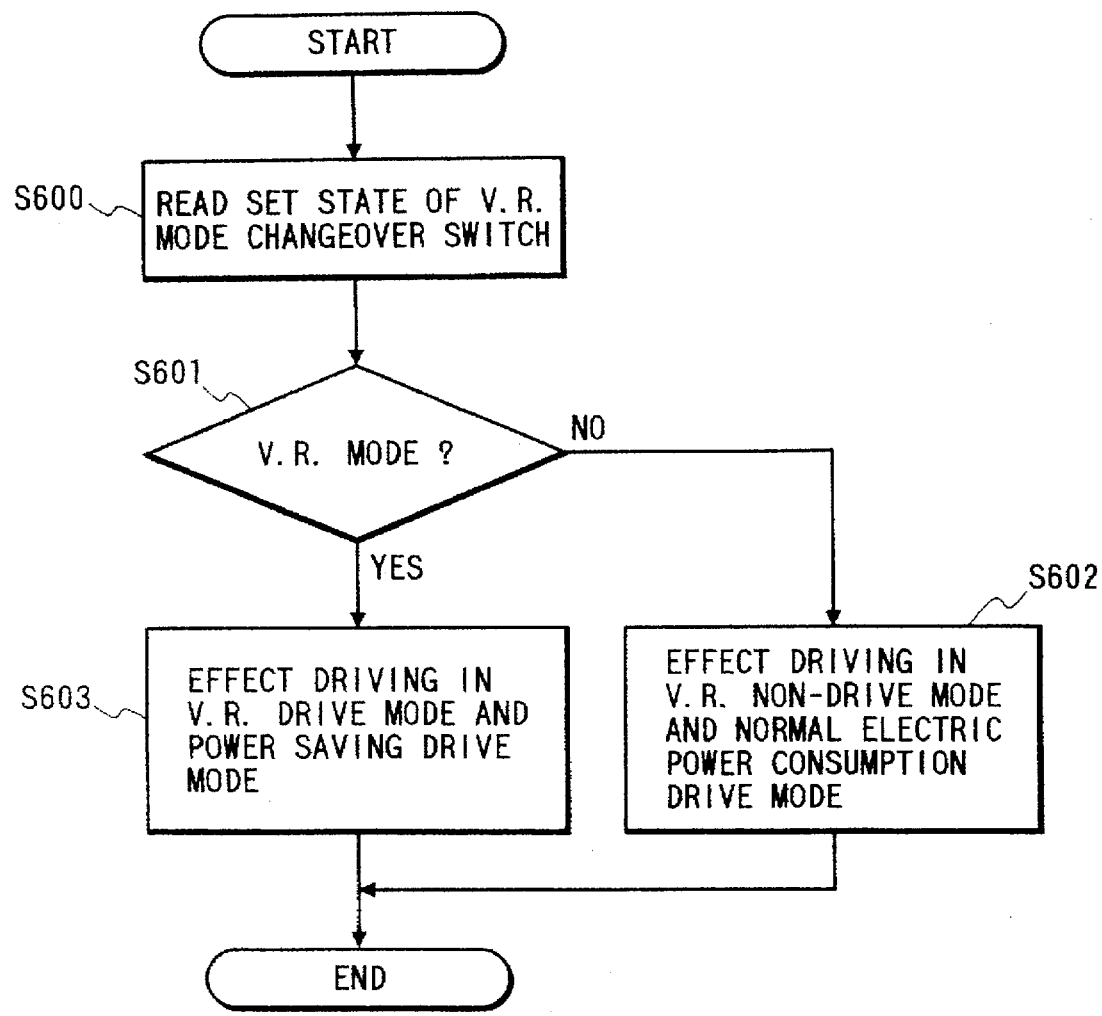
FIG. 16 is a flowchart showing a flow of drive control of a drive mechanism in the vicinity of a lens element in the fifth embodiment.

FIG. 16 is a main flowchart in the fifth embodiment, i.e., a drive control flowchart for the driving mechanisms in the vicinity of the lens element.

In step S600, upon operating the half-depression switch 69a of the release switch 69, the body control unit 67 starts a series of photography preparatory operations in the photographing apparatus. The lens control unit 61 also starts the same operations, reads a set status of the vibration reducing mode changeover switch 64, and starts selecting an operation mode (step S601).

Determined in step S601 is whether the thus read set status of the vibration reducing mode changeover switch 64 is a vibration reducing mode or not. If not the vibration reducing mode, the determination is negative (NO), and the processing proceeds to step S602. On the other hand, if the mode is the vibration reducing mode, the determination is affirmative (YES), and the processing proceeds to step S603.

In step S602, though a detailed description will be given later on (referring to FIG. 17), the lens control unit 61 inhibits the drive of the vibration reducing drive unit 63 and carries out the control of driving the lens moving unit 65 and the stop driving unit 66 in a status of a normal electric power consumption drive mode (a vibration reducing non-drive and a drive in the normal electric power consumption drive mode), thus finishing the main procedure.

In step S603, though a detailed explanation will be given later on (referring to FIG. 18), the lens control unit 61 executes the control of the drive of the vibration reducing drive unit 63 and also the control of driving the lens moving unit 65 and the stop drive unit 66 in a power saving drive mode (the vibration reducing drive and the drive in the power saving drive mode), thus finishing the main procedure.

Figure 17:
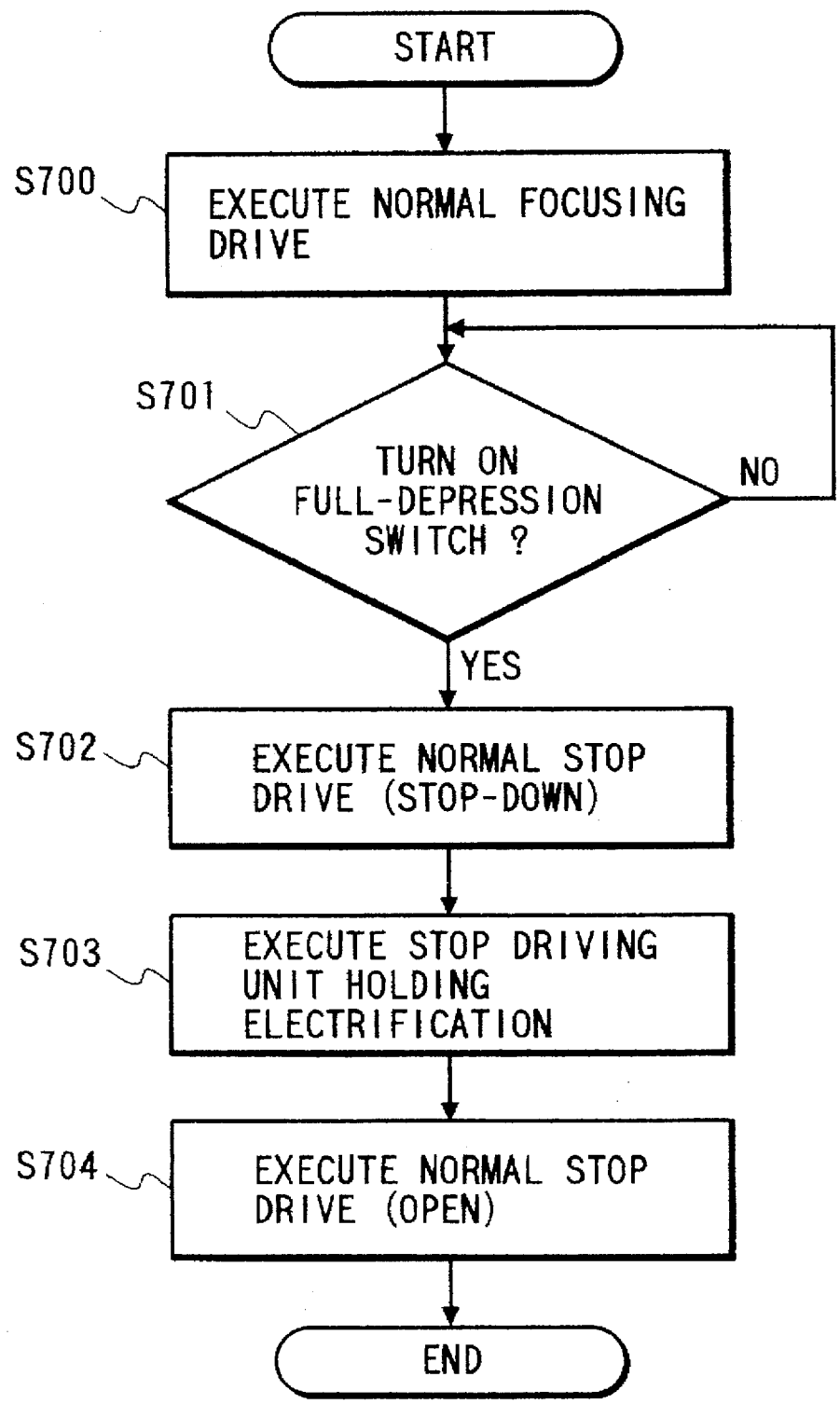
FIG. 17 is a flowchart showing a vibration reducing non-drive mode and a normal current consumption drive mode in the fifth embodiment.

FIG. 17 is a flowchart showing details of step S602 in FIG. 16, i.e., a flowchart showing the vibration reducing non-drive and the drive in the normal electric power consumption drive mode.

In step S700, the lens control unit 61 controls the drive of the lens moving unit 65 in the normal electric power consumption drive mode on the basis of focus detection data given from the body control unit 67, thereby making the photographing optical system focalize.

In step S701, the body control unit 67 determines whether or not the full-depression switch 69b is "ON"-operated. If "ON"-operated, the determination is affirmative (YES), and the processing proceeds to step S702. Whereas if not "ON"-operated, the determination is negative (NO), and the processing returns to relevant step S701, i.e., the full-depression switch waits for being "ON"-operated.

In step S702, when the full-push switch 69b is "ON"-operated, the body control unit 67 starts the series of exposure operations in the photographing apparatus and transmits a notice of this start to the lens control unit 61 through communication. The lens control unit 61 takes a timing upon receiving the start notice from the body control unit 67, controls the drive of the stop driving unit 66 in the normal electric power consumption drive mode, and stops down the aperture to a predetermined aperture value.

The lens control unit 61 transmits a timing of completion of the stop-down to the body control unit 67 through the communication. The body control unit 67, upon receiving this end notice, moves to next step S703. However, the way of taking the timing may be, e.g., given as follows.

The body control unit 67 previously stores a drive stop-down time in the normal electric power drive mode. The body control unit 67 itself controls a time lag to proceed to the next step S703.

Further, the lens control unit 61 previously transmits an item of time-lag data to the body control unit 67 through the communication, and the time is counted by the body control unit 67.

In step S703, the body control unit 67 controls an unillustrated shutter drive mechanism to start a film exposure. The lens control unit 61 controls the drive of the stop drive unit 66 so as to hold the predetermined aperture value. On this occasion, the lens control unit 61 gets the stop drive unit 66 continuously charged with electricity.

This operation intends to prevent the once-set aperture value from deviating due to a shutter drive shock and a mirror drive shock just before starting the exposure.

Further, when the stepping motor drives the stop, a motor drive step position can be set in a middle position of a stator by flowing a holding current. With this operation, the number of steps of the stop can be set twice as large as the number of steps of the stepping motor, whereby the much finer stop control can be performed.

In the case of taking the above-mentioned construction, as a matter of course, the holding current of the stepping motor is required also during the exposure.

In step S704, the body control unit 67 finishes the series of exposure operations in the photographing apparatus and transmits the end notice to the lens control unit 61 through the communication. The lens control unit 61 takes a timing upon receiving the end notice via the communication from the body control unit 67. Then, the lens control unit 61 controls the drive of the stop driving unit 66 in the normal electric power consumption drive mode and opens the aperture, thus finishing the main procedure.

Figure 18:
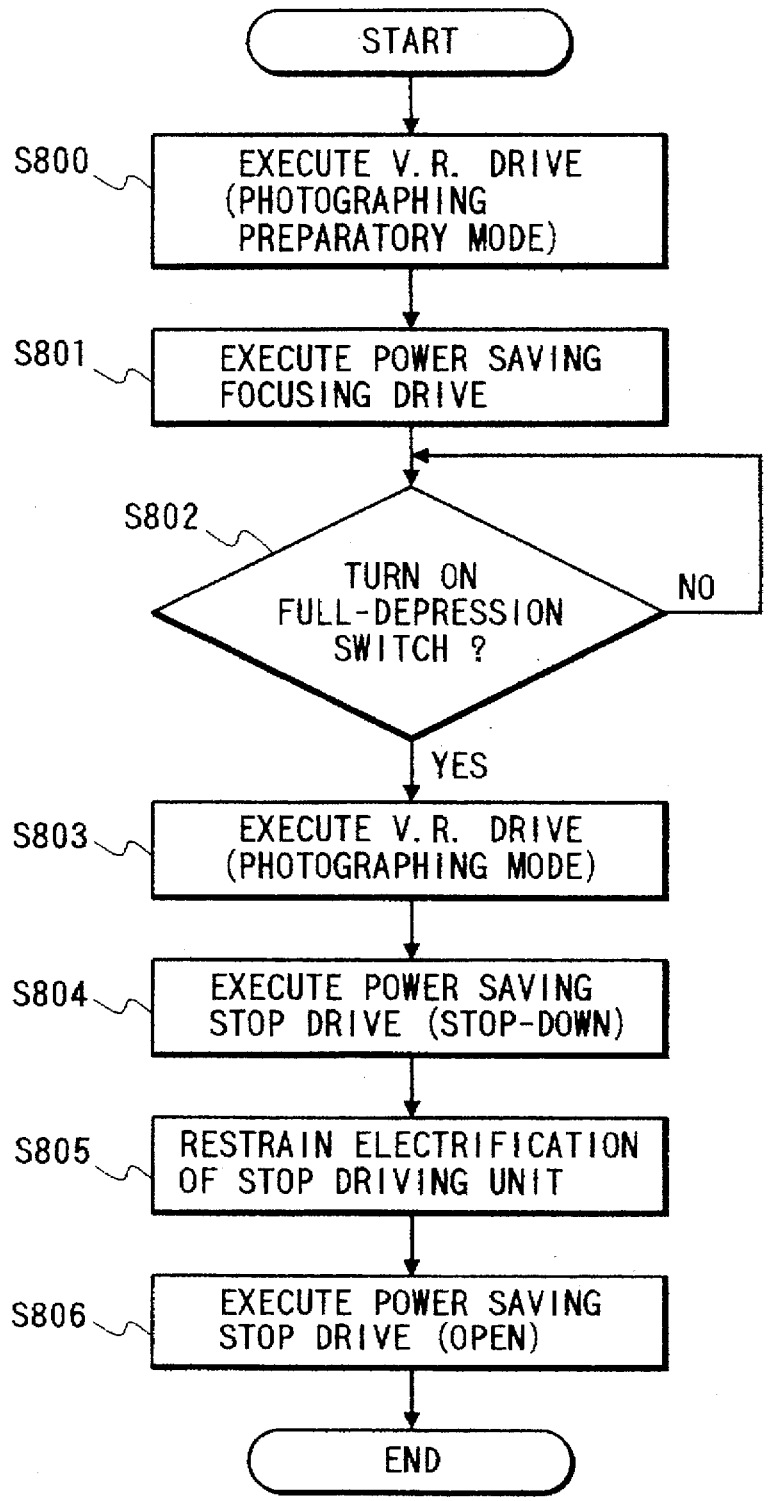
FIG. 18 is a diagram showing a vibration reducing drive mode and a power saving drive mode in the fifth embodiment.

Next, FIG. 18 is a flowchart showing details of step S603 in FIG. 16, i.e., a flowchart showing the vibration reducing drive and the drive in the power saving drive mode.

In step S800, the lens control unit 61 controls the drive of the vibration reducing drive unit 63. Note that if the vibration reducing drive program (a duration-of-photographing-preparation mode) for a duration of the photographing preparation is prepared, the drive control thereof is carried out.

In step S801, the lens control unit 61 controls the drive of the lens moving unit 65 in the power saving drive mode on the basis of the focus detection data transmitted from the body control unit 67 through the communication, thereby making the photographing optical system focalize.

In the power saving drive mode, the drive control is effected so that the electric power supplied to the lens moving actuator is smaller than the normal electric power. That is, an operating speed is set lower than usual.

Figure 19:
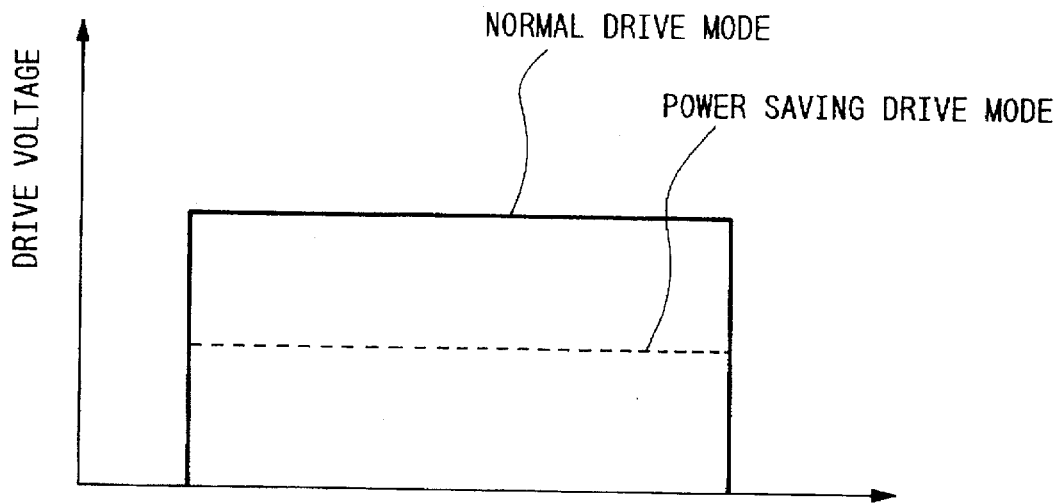
FIG. 19 is a diagram showing a DC motor voltage waveform (voltage level control) when performing a focusing drive in the fifth embodiment.

FIG. 19 is a diagram illustrating a DC motor voltage waveform (voltage level control) during the focusing drive in step S700 of FIG. 17 and in step S801 of FIG. 18.

Specifically, as shown in, e.g., FIG. 19, if the lens moving unit 65 controls a voltage level by use of a DC motor, the voltage applied across the DC motor is set lower than a normal drive voltage.

Figure 20:
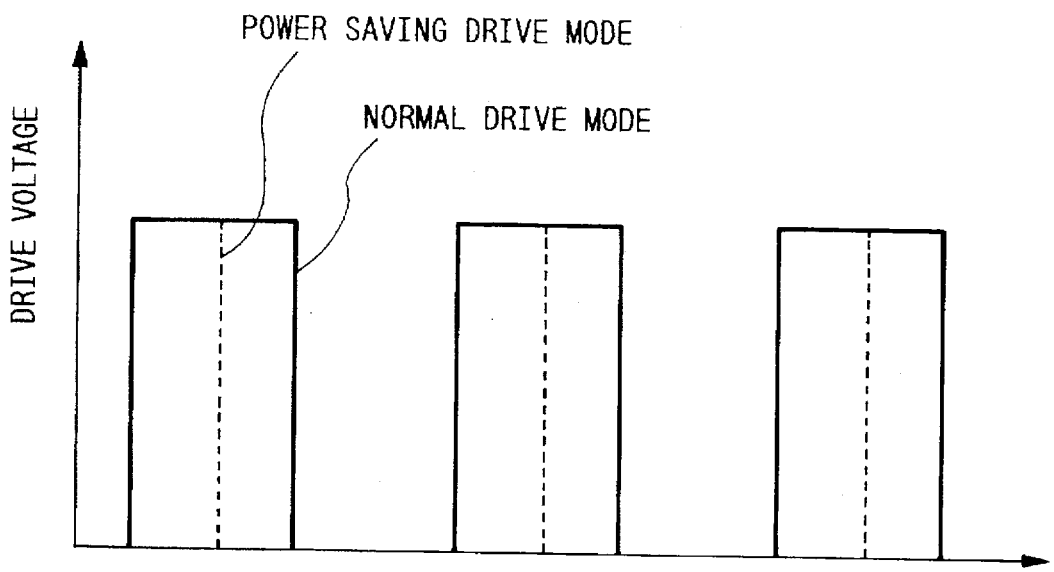
FIG. 20 is a diagram showing a DC motor voltage waveform (PWM control) when performing the focusing drive in the fifth embodiment.

Further, FIG. 20 is a diagram showing a DC motor voltage waveform (PWM control) during the focalizing drive in steps S700, S801 of FIGS. 17 and 18. As shown in, e.g., FIG. 20, however, if the lens moving unit 65 performs duty-ratio control as in the case of the PWM control, a duty ratio is set lower than under the normal drive control.

As a matter of course, a low current may be flowed by controlling the electric current. An electric power given by "voltage"×"current" may also be restrained.

What is herein noted is that the time up to the focusing elongates by restraining the electric power for the focalizing drive as stated above, but, as a result, a time for stabilizing an output of the vibration detecting unit 62 can be secured. It is because the vibration detecting unit 62 requires a predetermined time after switching ON the power supply to obtain the stable output.

Incidentally, even when restraining the consumption of the electric power (resulting in a low-speed drive), and if a considerable time is needed till focusing is attained, although the effect of saving the energy seems to be reduced, the power supply (normally the battery) exhibits such a property that the consumption thereof is more intensive as a larger current runs in terms of the nature thereof. Hence, it is significant to restrain the consumption of the electric power (current) per time.

In step S802, the body control unit 67 determines whether or not the full-depression switch 69b is "ON"-operated. If "ON"-operated, the determination is affirmative (YES), and the processing proceeds to step S803. Whereas if not "ON"-operated, the determination is negative (NO), and the processing returns to relevant step S802, i.e., the full-depression switch waits for being "ON"-operated.

In step S803, the lens control unit 61 controls the drive of the vibration reducing drive unit 63 in accordance with a program (photographing mode) for the photography. Incidentally, it is permitted that the same control as the control in the duration-of-photographing-preparation mode be performed.

On the occasion of starting the drive, if the drive position of the vibration reducing drive unit 63 is once reset to a neutral point, this may be effective in terms of securing a vibration reducing stroke during the exposure. As a matter of course, the operation of resetting the drive position to the neutral point may not be carried out if unnecessary.

In step S804, when the full-depression switch 69b is "ON"-operated, the body control unit 67 starts the series of exposure operations in the photographing apparatus, and transmits a notice of the start to the lens control unit 61 through communication. The lens control unit 61 takes a timing upon receiving the start notice from the body control unit 67, controls the drive of the stop driving unit 66 in the power saving drive mode, and stops down the aperture to a predetermined aperture value.

The lens control unit 61 transmits a timing of completion of the stop-down to the body control unit 67 through the communication. The body control unit 67, upon receiving this end notice, moves to next step S805. However, the way of taking the timing may be, e.g., given as follows.

The body control unit 67 previously stores a drive stop-down time in the power saving drive mode. The body control unit 67 itself controls a time lap, which will proceed to the next step S805.

Further, the lens control unit 61 previously transmits the above time-lap data to the body control unit 67 through the communication, and the time is counted by the body control unit 67.

In the power saving drive mode, the drive control is performed so that the stop driving actuator is supplied with a smaller amount of electric power than usual. A specific way is given as below.

Figure 21:
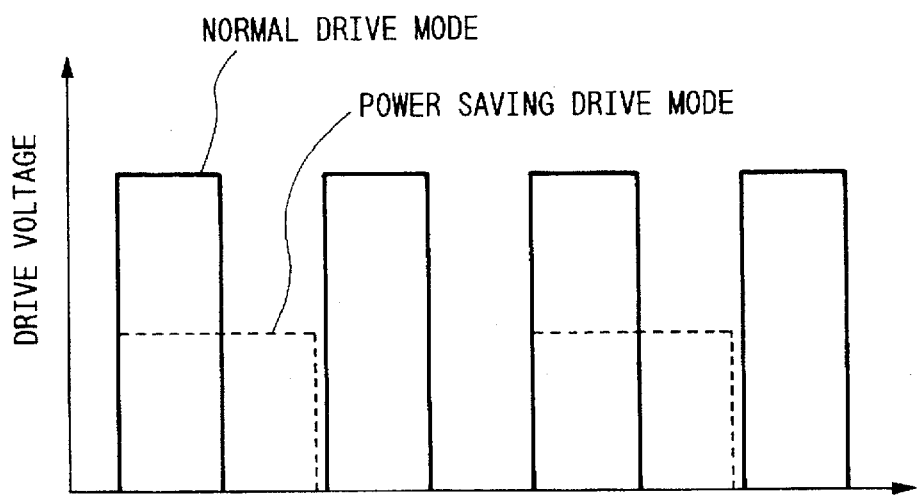
FIG. 21 is a stepping motor voltage waveform when executing a stop drive (stop-down) in the fifth embodiment.

FIG. 21 is a diagram illustrating a stepping motor voltage waveform during a stop drive (stop-down). If the stop drive unit 66 executes pulse control by use of, e.g., a stepping motor, as shown in FIG. 21, a voltage per pulse is set lower than in the normal electric power consumption drive mode.

Alternatively, a speed of generating the pulse is set slower than in the normal electric power consumption drive mode, whereby the electric power per time may be restrained.

As a matter of course, a low current may run by controlling the electric current. An electric power given by "voltage"×"current" may also be restrained. As at the time of the focusing drive, this may be effective in securing the time for stabilizing the output of the vibration detecting unit 62 as described above.

In step S805, the body control unit 67 controls the unillustrated shutter drive mechanism to start the film exposure and notifies the lens control unit 61 of the start of exposure though the communication. The lens control unit 61 restrains the stop drive unit 66 from being charged with electricity in order to save the electric power upon receiving the notice of the exposure start.

Figure 22:
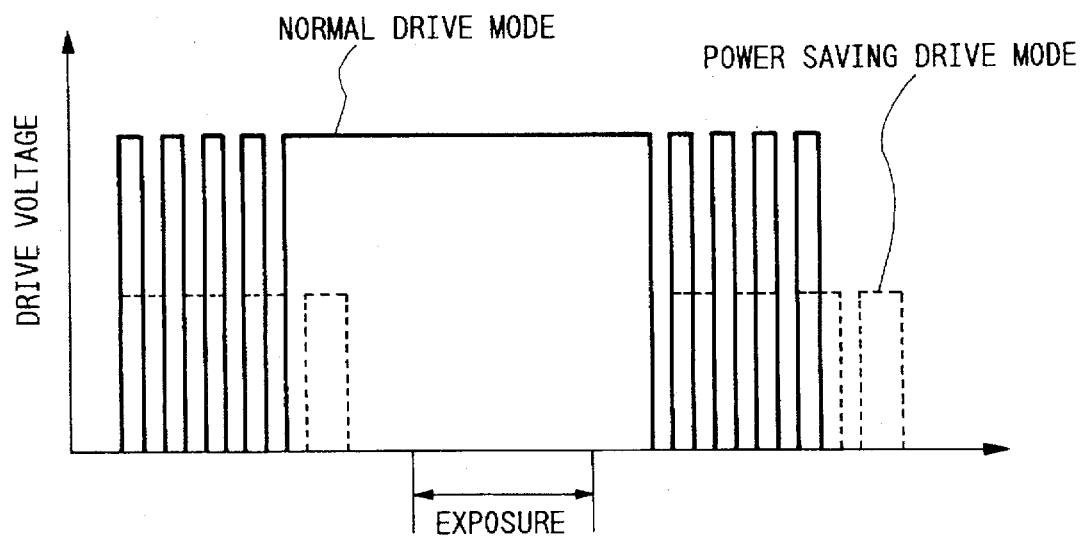
FIG. 22 is a diagram showing a stepping motor voltage waveform when executing a stop drive (open) in the fifth embodiment.

FIG. 22 is a diagram showing a stepping motor voltage waveform during the stop drive (open). If the stop driving unit 66 takes the pulse control involving the use of the stepping motor, and if a stop position of the rotor is coincident with a position of the stator, the stepping motor has a holding torque to some extent even when no holding current flows.

Then, in the power saving drive mode in step S805 for operating the vibration reducing drive unit 63, the rotor drive step position is not set in the middle position of the stator (see FIG. 22).

If constructed in this way, though the number of steps of the stop can not be increased with respect to the number of steps of the stepping motor, the electric power can be saved after finishing the stop drive.

The position of the stop is restricted, however, the adjustment in terms of the shutter exposure can be made for attaining a proper exposure, and hence the apparatus manages to operate without exerting any adverse influence upon a photographed result.

Further, the lens control unit 61 transmits to the body control unit 67 an item of data on (a difference) the stop positions taken in the power saving drive mode and in the normal electric power through the communication. This item of data can be used for the exposure calculation executed by the body control unit 67.

Moreover, if the body control unit 67 itself stores the data on (the difference) the stop positions taken in the power saving drive mode and in the normal electric power consumption drive mode, the exposure may be calculated by using this item of data.

Further, it is ideal that the holding current is not flowed at all. As stated earlier, however, there must be a possibility in which various vibration occurs during (in the vicinity of) the exposure. Therefore, a minimum current may flow when existing in the step position (as in a possible-of-holding state of the step position against a shock). With this arrangement also, the electric power can be by far more saved than holding the rotor in the middle step position.

In step S806, the body control unit 67 finishes the series of exposure operations in the photographing apparatus and transmits the end notice to the lens control unit 61 through the communication. The lens control unit 61 takes a timing upon receiving the end notice from the body control unit 67, controls the drive of the stop driving unit 66 in the power saving drive mode, and opens the aperture, thus finishing the main procedure.

Note that if a mode of controlling the drive of a photographing program (a photographing mode) of the vibration reducing drive unit 63 is for temporarily stopping the vibration reducing drive after completing the exposure (there is no real trouble even when the vibration reducing drive is not effected during the mirror-down process after completing the exposure), the power saving drive may not be particularly executed, and therefore the aperture opening drive control may be performed in the normal electric power consumption drive mode. Then, the processing may enter the next operation in a short period of time.

In the fifth embodiment discussed above, the explanation has been given such that the power saving drive mode is applied to both of the lens moving unit 65 and the stop driving unit 66. The present invention is not, however, limited to the above-mentioned but may be applied to, e.g., only the drive of any one of the lens moving unit 65 and the stop driving unit 66. With this application also, it is obvious that the effects of the present invention can be obtained.

Particularly if there is the driving unit other than the above-described driving units that consume the electric power during (or in the vicinity of) the exposure, i.e., during the period most important for driving the vibration reducing drive unit 63, the power saving drive mode of the present invention is applied so as to restrain the consumption of the electric power of the driving units.

Further, in the fifth embodiment discussed above, the photographing lens attached to the body of the photographing apparatus might given such an impression that it naturally must include the vibration reducing drive unit 63. The present invention is, however, applicable to such a case as to attach a photographing lens having no vibration reducing drive unit 63.

More specifically, as can be assumed from the above description, when attaching the photographing lens that does not have the vibration reducing drive unit 63, there is absolutely no necessity for selecting the power saving drive mode. In the case of the photographing lens having the vibration reducing drive unit 63, there increases a rate at which the vibration reducing drive is to be carried out, and hence the drive control in the power saving drive mode of the present invention is needed.

Then, the body control unit 67 of the photographing apparatus determines whether the attached photographing lens is the photographing lens having the vibration reducing drive unit 63 or the photographing lens having no vibration reducing drive unit 63. In the case of the photographing lens having no vibration reducing drive unit 63, the drive control is executed in the normal electric power consumption drive mode. In the case of the photographing lens having the vibration reducing drive unit 63, the above-mentioned drive control is performed.

Note the drive control may be carried out in the power saving drive mode irrespective of setting whether the vibration should be reduced or not in the case of the control of the lens moving unit 65.

Further, when driving the stop by the stepping motor regardless of setting whether the vibration should be reduced or not, the lens control unit 61 does not set the rotor drive step position to the middle position of the stator, and, during the exposure, the electrification of the stop drive unit 66 may be stopped.

As a matter of course, in this case, the stop position is more restricted than stopped in an intermediate step. However, the lens control unit 61 transmits the data about the stop position taken by the lens control unit 61 to the body control unit 67 through the communication, and this item of data can be also used for the exposure calculation performed by the body control unit 67. For attaining the proper exposure, the adjustment can be also made in terms of the shutter exposure time, and, therefore, the apparatus manages to operate without exerting any adverse influence on the photographed result.

Furthermore, the present invention is not confined to the embodiments discussed above but may include a variety of changes and modifications that can be made. For instance, the description has been given by way of the example of the lens device of the single-lens reflex camera having the attachable/detachable lens and body devices. The present invention is, however, applicable to a lens device of a compact camera.

Moreover, in the first embodiment, the function of stopping the vibration reducing control device or the preparatory flash device if the power supply is deficient of voltage involves the use of the control device constructed of the vibration reducing control microcomputer 3, the ultrasonic motor microcomputer 16 and the communication microcomputer 24. The present invention is not, however, limited to only such a mode. For example, the body device is equipped with a manual switch capable of manually changing over the vibration reducing control or the pink-eye preparatory flash control or both of them, and the user of the photographing apparatus changes over this manual switch. With this construction, the preparatory flash device or the vibration reducing control device may be stopped.

Therefore, it is intended that the invention not be limited to the preferred embodiments described herein, but that the invention will include all embodiments falling within the scope of the appended claims.

What is claimed is:

1. A photographing apparatus having a vibration reducing mechanism, comprising:
   a photographing optical system;
   a preparatory flash device to prevent pink-eye;
   a vibration reducing mechanism to detect a vibration quantity of an optical axis of said photographing optical system and to move a whole or a part of said photographing optical system relative to a photographing picture;
   a detecting unit to detect the fact that said vibration reducing mechanism is in an operable state; and
   a control unit to stop said preparatory flash device when said vibration reducing mechanism is in an operable state.

2. A photographing apparatus having a vibration reducing mechanism according to claim 1, wherein said control unit detects a voltage of a drive power supply for said vibration reducing mechanism and for said preparatory flash device and, when the detected voltage is sufficient, operates said preparatory flash device together with said vibration reducing mechanism, or operates said vibration reducing mechanism together with said preparatory flash device.

3. A photographing apparatus having a vibration reducing mechanism according to claim 2, wherein
   said control unit allows for manually selecting an operation of said vibration reducing mechanism and/or said preparatory flash device.

4. A photographing apparatus having a vibration reducing mechanism according to claim 3, wherein when manually selecting the operations of said vibration reducing mechanism and said preparatory flash device, said control unit indicates an alarm in the case of selecting any one of the operations.

5. A photographing apparatus having a vibration reducing mechanism, comprising:
   a photographing optical system;
   a preparatory flash device to prevent pink-eye;
   a vibration reducing mechanism to detect a vibration quantity of an optical axis of said photographing optical system and to move a whole or a part of said photographing optical system relative to a photographing picture; and
   a control unit to stop said vibration reducing mechanism when said preparatory flash device is in an operable state.

wherein said control unit detects a voltage of a drive power supply for said vibration reducing mechanism and for said preparatory flash device and, when the detected voltage is sufficient, operates said preparatory flash device together with said vibration reducing mechanism, or operates said vibration reducing mechanism together with said preparatory flash device.

6. A photographing device having a vibration reducing mechanism according to claim 5, wherein said control unit is capable of manually selecting an operation of at least one of said vibration reducing mechanism and said preparatory flash device.

7. A photographing apparatus having a vibration reducing mechanism according to claim 6, wherein when manually selecting the operations of said vibration reducing mechanism and said preparatory flash device, said control unit indicates an alarm in the case of selecting any one of the operations.

8. A photographing apparatus having a vibration reducing mechanism, comprising:

a photographing optical system;

a vibration reducing mechanism to detect a vibration quantity of an optical axis of said photographing optical system and to move a at least a part of said photographing optical system relative to a photographing picture on the basis of the detected vibration quantity; and at least one electric power consuming source, wherein said photographing apparatus includes a control device to stop or restrain an operation of said vibration reducing mechanism when said at least one electric power consuming source operates.

9. A photographing apparatus having a vibration reducing mechanism according to claim 8, wherein said control device resets the operation of said vibration reducing mechanism when said electric power consuming source completely stops after stopping or restraining the operation of said vibration reducing mechanism.

10. A photographing apparatus having a vibration reducing mechanism according to claim 9, further comprising a film feed motor and a shutter, wherein the timing is an operation timing of the film feed motor and/or a mirror-down drive timing of the shutter.

11. A photographing apparatus having a vibration reducing mechanism, comprising:

a photographing optical system;

a vibration reducing mechanism to detect a vibration quantity of an optical axis of said photographing optical system and to move a whole or a part of said photographing optical system relative to a photographing picture on the basis of the detected vibration quantity; and at least two electric power consuming sources operating independently of each other or in relation to each other, wherein said photographing apparatus has a control device to prevent said at least two electric power consuming sources from being driven simultaneously after finishing a film exposure when said vibration reducing mechanism is in an operable state.

12. A photographing apparatus having a vibration reducing mechanism according to claim 11, wherein each of said electric power consuming sources is a motor for driving a mechanism member.

13. A photographing apparatus having a vibration reducing mechanism according to claim 12, further comprising a film feed motor and a sequence control motor, wherein a combination of two or more driving motors that are not simultaneously driven is a combination of the film feed motor to wind and rewind a film, and the sequence control motor to drive other mechanical members.

14. A photographing apparatus having a vibration reducing mechanism according to claim 13, further comprising at least one of a mirror-up and mirror-down driving motor and a shutter curtain tripping motor, wherein said sequence control motor for driving other mechanical members includes the mirror-up and mirror-down driving motor and the shutter curtain tripping motor.

15. A photographing apparatus including a lens having a vibration reducing mechanism, comprising:

a first driving mechanism to reduce vibration;

second driving mechanisms provided in the vicinity of the lens;

a setting switch to set and to input whether vibration should be reduced; and a drive control unit to control a drive of only said second driving mechanisms, or to perform the drive control inclusive of the drive control of said first driving mechanism in accordance with a set state of said setting switch, wherein said drive control unit controls the drive of said second driving mechanisms in a normal electric power consumption drive mode in the control of the drive of only said second driving mechanism, and controls the drive of said second driving mechanisms in a power saving drive mode in the drive control inclusive of the drive control of said first driving mechanism.

16. A photographing apparatus having a vibration reducing mechanism according to claim 15, wherein said drive control unit executes the drive control so that an operating speed is lower of said second driving mechanism in the power saving drive mode than in the normal electric power consumption drive mode.

17. A photographing apparatus having a vibration reducing mechanism according to claim 16, wherein said second driving mechanisms includes a drive mechanism for driving the lens in an optical-axis direction.

18. A photographing apparatus having a vibration reducing mechanism according to claim 16, further comprising light quantity adjusting blades wherein said second driving mechanisms include a drive mechanism for driving the light quantity adjusting blades.

19. A photographing apparatus having a vibration reducing mechanism according to claim 15, wherein said drive control unit controls the drive of said second driving mechanisms in the power saving drive mode by setting a duty ratio of a drive pulse to a duty ratio lower than in the normal electric power consumption drive mode.

20. A photographing apparatus having a vibration reducing mechanism according to claim 19, wherein said second driving mechanisms include a drive mechanism for driving the lens in the optical-axis direction.

21. A photographing apparatus having a vibration reducing mechanism according to claim 16, further comprising light quantity adjusting blades wherein said second driving mechanisms includes a drive mechanism for driving the light quantity adjusting blades.

22. A photographing apparatus having a vibration reducing mechanism according to claim 15, wherein said drive control unit controls the drive of said second driving mechanisms in the power saving drive mode by setting a speed of a drive pulse slower than in the normal electric power consumption drive mode.

23. A photographing apparatus having a vibration reducing mechanism according to claim 22, wherein said second driving mechanisms include a drive mechanism for driving the lens in the optical axis direction.

24. A photographing apparatus having a vibration reducing mechanism according to claim 22, further comprising light quantity adjusting blades wherein said second driving mechanisms include a drive mechanism for driving the light quantity adjusting blades.

25. A photographing apparatus including a lens having a vibration reducing mechanism, comprising:
 a first drive mechanism to reduce vibration;
 second drive mechanisms provided in the vicinity of the lens;
 a setting switch to set and to input whether the vibration should be reduced; and
 a drive control unit to control a drive of only said second drive mechanisms, or to perform the drive control inclusive of the drive control of said first drive mechanism in accordance with a set state of said setting switch,
 wherein said drive control unit controls the drive of said second drive mechanisms in a normal electric power consumption drive mode when controlling the drive of said second drive mechanisms.

26. A photographing apparatus having a vibration reducing mechanism according to claim 25, wherein said drive control unit executes the drive control so that an operating speed of said second drive mechanisms in a power saving drive mode is lower than in the normal electric power consumption drive mode.

27. A photographing apparatus having a vibration reducing mechanism according to claim 26, wherein said second drive mechanisms include a drive mechanism for driving the lens in the optical-axis direction.

28. A photographing apparatus having a vibration reducing mechanism according to claim 26, further comprising light quantity adjusting blades, wherein said second drive mechanisms include a drive mechanism for driving the light quantity adjusting blades.

29. A photographing apparatus having a vibration reducing mechanism according to claim 25, wherein said drive control unit controls the drive of said second drive mechanisms in a power saving drive mode by setting a duty ratio of a drive pulse to a duty ratio lower than in the normal electric power consumption drive mode.

30. A photographing apparatus having a vibration reducing mechanism according to claim 29, wherein said second drive mechanisms include a drive mechanism for driving the lens in the optical-axis direction.

31. A photographing apparatus having a vibration reducing mechanism according to claim 29, further comprising light quantity adjusting blades, wherein said second drive mechanisms include a drive mechanism for driving the light quantity adjusting blades.

32. A photographing apparatus having a vibration reducing mechanism according to claim 25, wherein said drive control unit controls the drive of said second drive mechanisms in a power saving drive mode by setting a speed of drive pulse slower than in the normal electric power consumption drive mode.

33. A photographing apparatus having a vibration reducing mechanism according to claim 32, wherein said second drive mechanisms include a drive mechanism for driving the lens in the optical-axis direction.

34. A photographing apparatus having a vibration reducing mechanism according to claim 32, further comprising light quantity adjusting blades, wherein said second drive mechanisms include a drive mechanism for driving the light quantity adjusting blades.

35. A photographing apparatus having a vibration reducing mechanism, attachable with a photographing lens having a first drive mechanism to reduce vibration, said photographing apparatus comprising:
 second drive mechanisms provided in the vicinity of the photographing lens;
 a setting switch to set and to input whether the vibration should be reduced; and
 a drive control unit to control a drive of only said second drive mechanisms, or to perform the drive control inclusive of the drive control of said first drive mechanism in accordance with a set state of said setting switch, wherein
 said drive control unit includes:
  a determining unit to determine whether said photographing lens to be attached has said first drive mechanism to reduce the vibration; and
  a selecting unit to select a drive mode in which said second drive mechanisms should be drive-controlled in a normal electric power consumption drive mode or in a power saving drive mode in accordance with a result of the determination made by said determining unit.

36. A photographing apparatus having a vibration reducing mechanism according to claim 35, wherein said drive control unit executes the drive the control so that an operating speed of said second drive mechanisms in the power saving drive mode is lower than in the normal electric power consumption drive mode.

37. A photographing apparatus having a vibration reducing mechanism according to claim 36, wherein said second drive mechanisms include a drive mechanism for driving the photographing lens in the optical-axis direction.

38. A photographing apparatus having a vibration reducing mechanism according to claim 36, further comprising light quantity adjusting blades, wherein said second drive mechanisms include a drive mechanism for driving the light quantity adjusting blades.

39. A photographing apparatus having a vibration reducing mechanism according to claim 35, wherein said drive control unit controls the drive of said second drive mechanisms in the power saving drive mode by setting a duty ratio of a drive pulse to a duty ratio lower than in the normal electric power consumption drive mode.

40. A photographing apparatus having a vibration reducing mechanism according to claim 39, wherein said second drive mechanisms include a drive mechanism for driving the photographing lens in the optical-axis direction.

41. A photographing apparatus having a vibration reducing mechanism according to claim 39, further comprising light quantity adjusting blades, wherein said second drive mechanisms include a drive mechanism for driving the light quantity adjusting blades.

42. A photographing apparatus having a vibration reducing mechanism according to claim 35, wherein said drive control unit controls the drive of said second drive mechanisms in the power saving drive mode by setting a speed of a drive pulse slower than in the normal electric power consumption drive mode.

43. A photographing apparatus having a vibration reducing mechanism according to claim 42, wherein said second drive mechanisms include a drive mechanism for driving the photographing lens in the optical-axis direction.

44. A photographing apparatus having a vibration reducing mechanism according to claim 42, further comprising light quantity adjusting blades, wherein said second drive mechanisms include a drive mechanism for driving the light quantity adjusting blades.

45. A photographing apparatus having a vibration reducing mechanism, comprising:

a first drive mechanism to reduce vibration;

second drive mechanisms provided in the vicinity of the lens;

a setting switch to set and to input whether the vibration should be reduced; and a drive control unit to control a drive of only said second drive mechanisms, or to perform the drive control inclusive of the drive control of said first drive mechanism in accordance with a set state of said setting switch, wherein said drive control unit controls the drive of said second drive mechanisms in a normal electric power consumption drive mode in the control of the drive of only said second drive mechanisms, and on the other hand restrains said second drive mechanisms from being charged with the electricity in the drive control inclusive of the drive control of said first drive mechanism.

46. A photographing apparatus having a vibration reducing mechanism according to claim 45, further comprising light quantity adjusting blades, wherein said second drive mechanisms include a drive mechanism for driving the light quantity adjusting blades.

47. A photographing apparatus comprising:

a vibration reducing mechanism;

a light quantity adjusting blades operating unit disposed independently from a shutter mechanism;

a control unit to prohibit simultaneous operation of said vibration reducing mechanism simultaneously with said light quantity adjusting blades operating unit, or to drive at least one of said vibration reducing mechanism and said light quantity adjusting blades operating unit in a power saving drive mode.

48. A photographing apparatus comprising:

a vibration reducing mechanism;

a mirror driving unit; and a control unit to prohibit simultaneous operation of said vibration reducing mechanism simultaneously with said mirror driving unit, or to drive at least one of said vibration reducing mechanism and said mirror driving unit in a power saving drive mode.

49. A photographing apparatus comprising:

a vibration reducing mechanism;

a pink-eye prevention unit;

a detecting unit to detect a specific state; and a control unit to prohibit simultaneous operation of said vibration reducing mechanism simultaneously with said pink-eye prevention unit, or to drive at least one of said vibration reducing mechanism and said pink-eye prevention unit in a power saving drive mode when said detecting unit detects the specific state, and to allow said vibration reducing mechanism and said pink-eye prevention unit to operate simultaneously in a normal electric power consumption drive mode when said detecting unit does not detect the specific state.

50. A photographing apparatus according to claim 49, wherein said detecting unit is a voltage detecting unit to detect the state in which the voltage of a drive power supply for the vibration reducing mechanism and the pink-eye prevention unit is insufficient.

51. A photographing apparatus comprising:

a driving unit; and a photographing lens determining unit to determine whether a mounted photographing lens has a vibration reducing mechanism;

wherein when said photographing lens determining unit determines that the mounted photographing lens has a vibration reducing mechanism, simultaneous operation of the driving unit and the vibration reducing mechanism is prohibited, or at least one of the vibration reducing mechanism and the driving unit is driven in a power saving drive mode.

52. A photographing apparatus having a vibration reducing mechanism, comprising:

a photographing optical system;

a vibration reducing mechanism to detect a vibration quantity of an optical axis of said photographing optical system and to move at least a part of said photographing optical system relative to a photographing picture on the basis of the detected vibration quantity; and at least one electric power consuming source, wherein said photographing apparatus includes a control device to restrain an operation of said vibration reducing mechanism when said at least one electric power consuming source operates.

53. A photographing apparatus having a vibration reducing mechanism, comprising:

a photographing optical system;

a vibration reducing mechanism to detect a vibration quantity of an optical axis of said photographing optical system and to move a whole or a part of said photographing optical system relative to a photographing picture on the basis of the detected vibration quantity;

an operation switch to set said vibration reducing mechanism in an operable state when ON-operated; and at least two electric power consuming sources operating independently of each other or in relation to each other, wherein said photographing apparatus has a control device to allow said at least two of said electric power consuming sources to operate simultaneously after finishing a film exposure when said operation switch is not ON-operated and to prevent said at least two electric power consuming sources from being driven simultaneously after finishing a film exposure when said operation switch is ON-operated.

* * * * *

UNITED STATES PATENT AND TRADEMARK OFFICE
CERTIFICATE OF CORRECTION

PATENT NO. : 5,724,617
DATED : March 3, 1998
INVENTOR(S) : Shinichi Hirano, et al.

It is certified that error appears in the above-identified patent and that said Letters Patent is hereby corrected as shown below:

Column 26, line 58, claim 21, change "16" to --19--.

Signed and Sealed this

Twenty-first Day of July, 1998

Attest:

Attesting Officer

BRUCE LEHMAN

Commissioner of Patents and Trademarks